United States Patent [19]

Ferguson et al.

[11] 3,903,403
[45] Sept. 2, 1975

[54] NUCLEAR POWER PLANT TRAINING SIMULATOR SYSTEM AND METHOD

[75] Inventors: Raymond W. Ferguson; Robert E. Converse, Jr., both of Pittsburgh, Pa.

[73] Assignee: Westinghouse Electric Corporation, Pittsburgh, Pa.

[22] Filed: Feb. 23, 1973

[21] Appl. No.: 335,286

[52] U.S. Cl. .................. 235/151.21; 35/13; 444/1; 176/19
[51] Int. Cl. ..... G06f 15/06; G06f 15/56; G09b 9/00
[58] Field of Search ........... 444/1; 235/184, 151.21; 176/19, 24; 35/10, 13, 10.2

[56] References Cited
UNITED STATES PATENTS 3,061,945  11/1962  Hawkins ................................. 35/10
3,237,318  3/1966  Schager .................................. 35/10

OTHER PUBLICATIONS

Reactor Simulator Utilizing a Vacuum System; Harry Reese, Jr.; RCA Technical Notes; RCA TN No.: 493, Sept. 1961.
Dynamic Simulation of a Fast Reactor; R. G. Olson, Nucleonics, May, 1957; pp. 76–79.
An Electronic Reactor Simulator; Ross Cameron & D. A. Austin; Nuclear Power; April, 1957, pp. 146–151.
PWR Training Simulator; J. P. Franz & W. H. Alliston; Nucleonics, May, 1957; pp. 80–83.

*Primary Examiner*—Malcolm A. Morrison
*Assistant Examiner*—Edward J. Wise
*Attorney, Agent, or Firm*—H. W. Patterson

[57] ABSTRACT

A method and system for simulating the real-time dynamic operation of a full scope nuclear powered electrical generating plant for operator training utilizing apparatus that includes a control console with plant component control devices and indicating devices for monitoring plant operation. A general purpose digital computer calculates the dynamic simulation data for operating the indicating devices in accordance with the operation of the control devices. The functions for synchronization and calculation are arranged in a priority structure so as to insure an execution order that provides a maximum overlap of data exchange and simulation calculations. Such an arrangement also provides for the completion of all data interchange and calculations during each repetitive calculation cycle.

30 Claims, 27 Drawing Figures

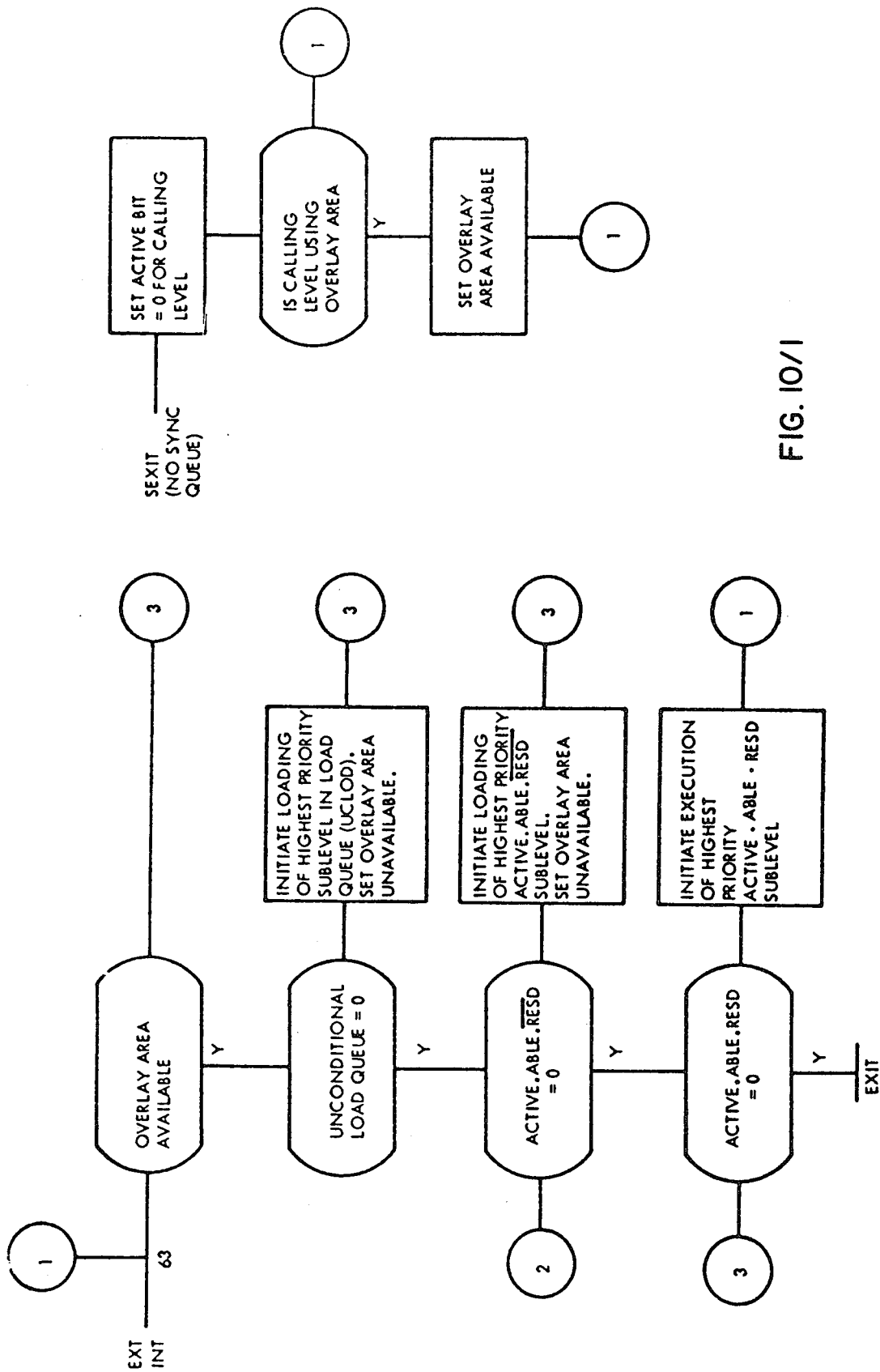
FIG. 10/1

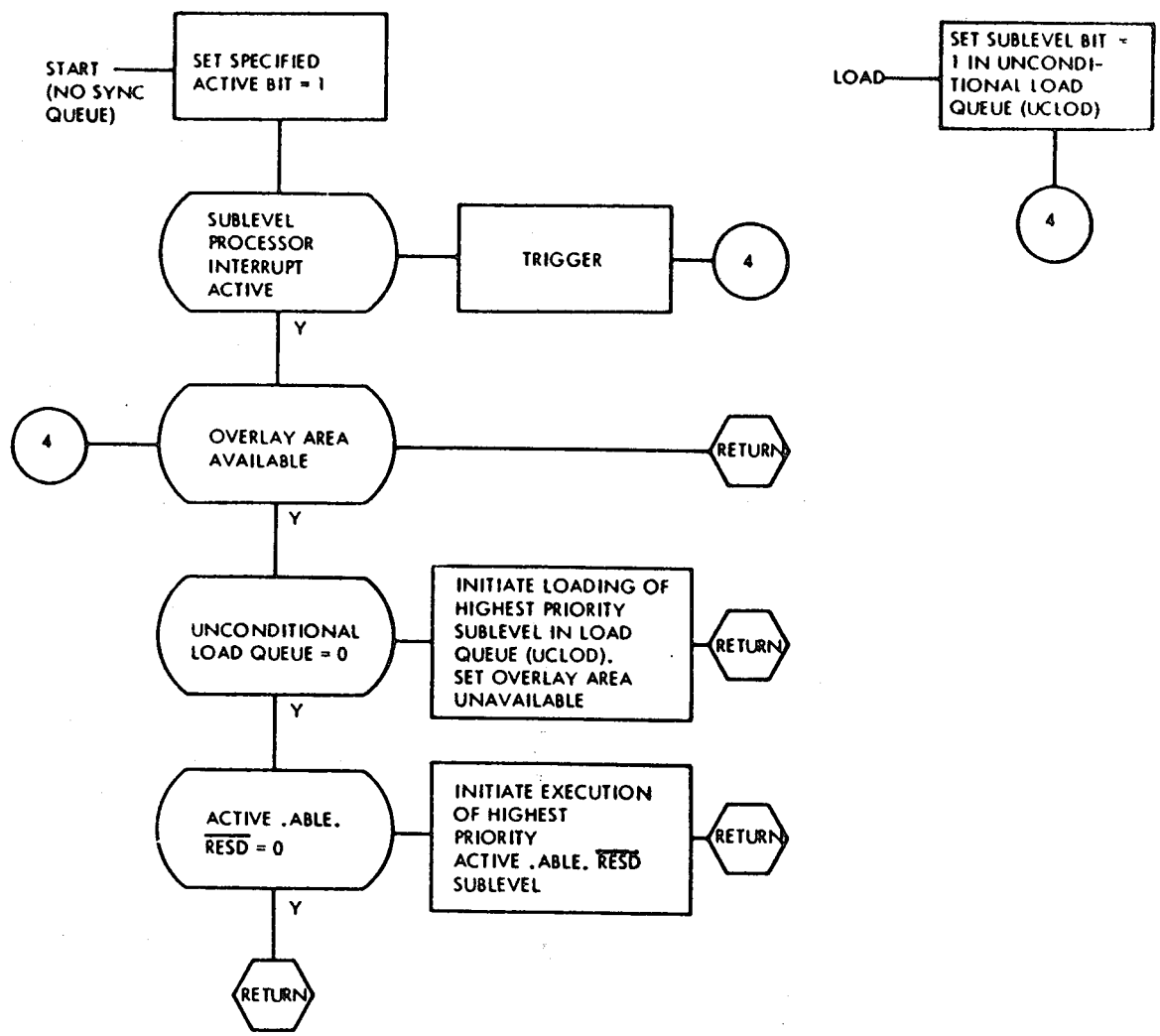
FIG. 10/2

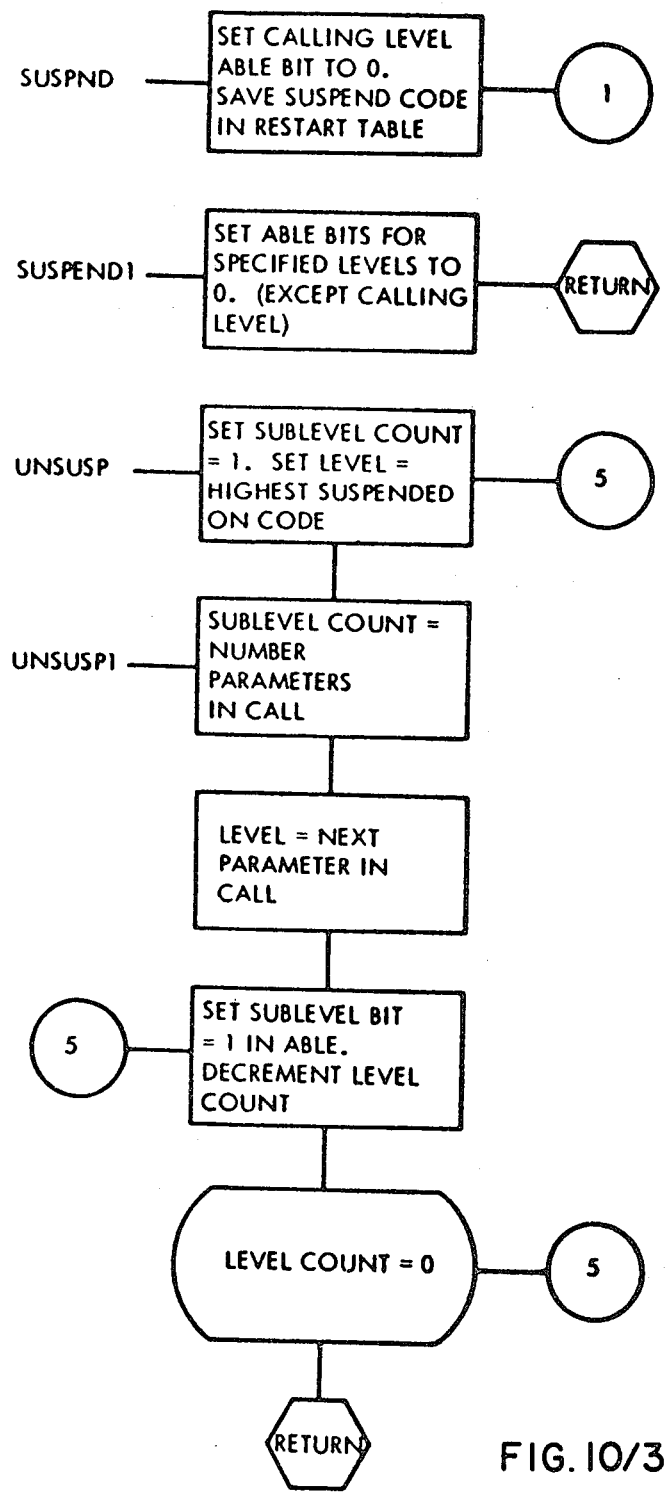
FIG. 10/3

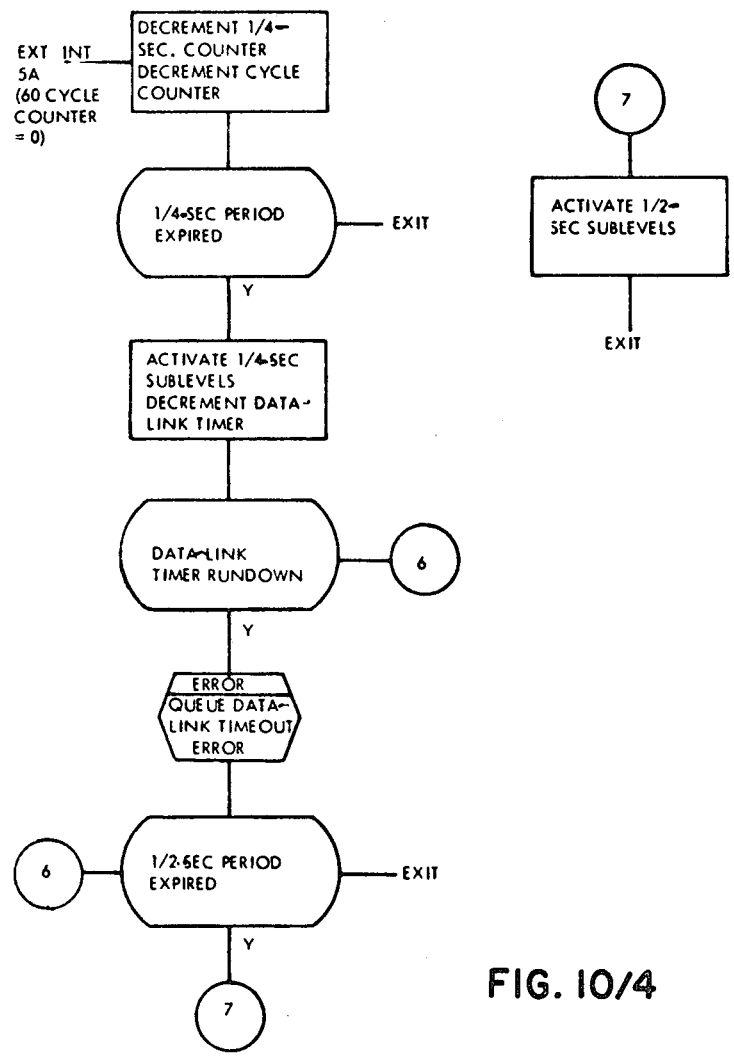
FIG. 10/4
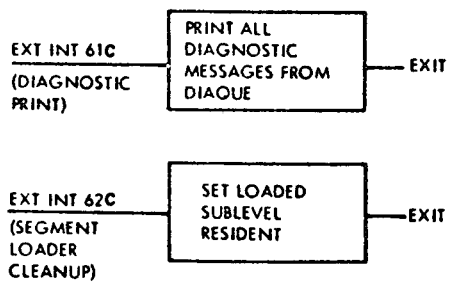
FIG. 10/5

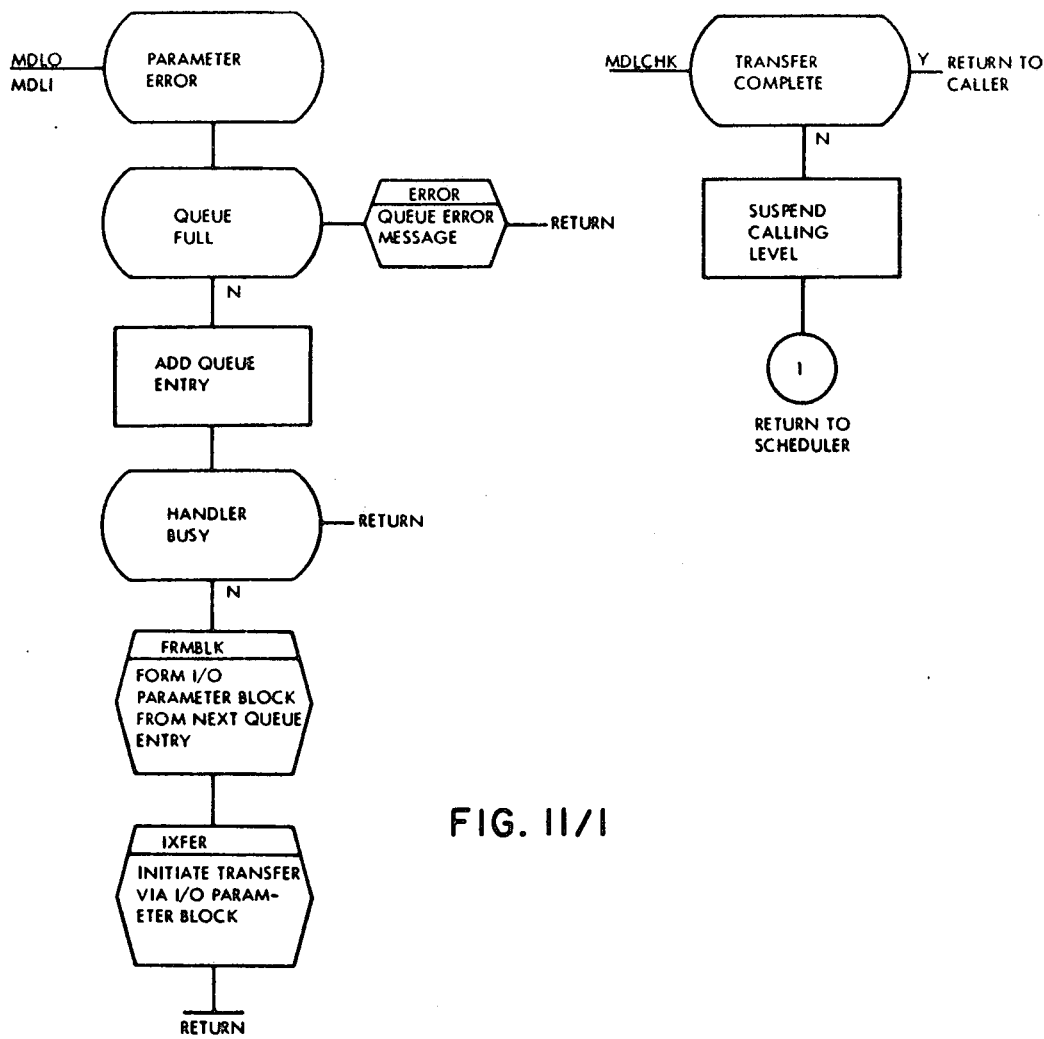
FIG. 11/1
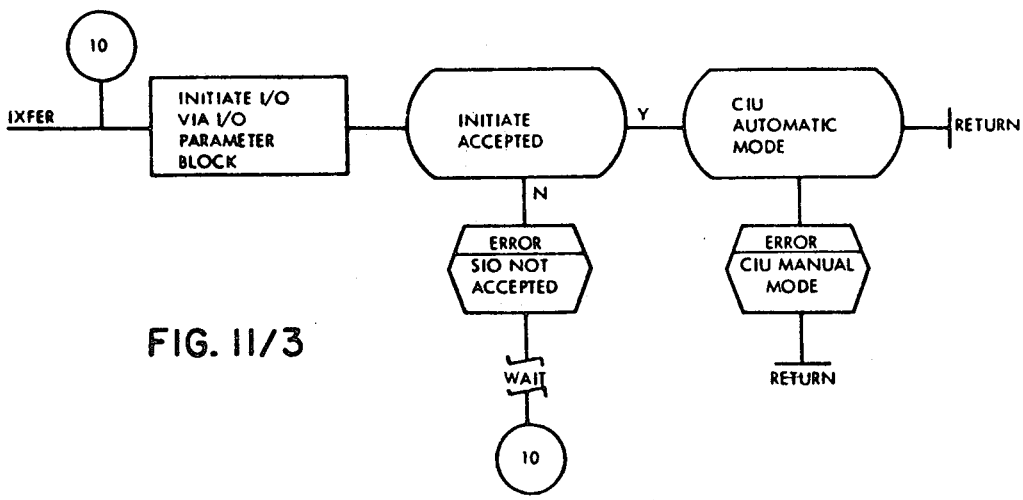
FIG. 11/3

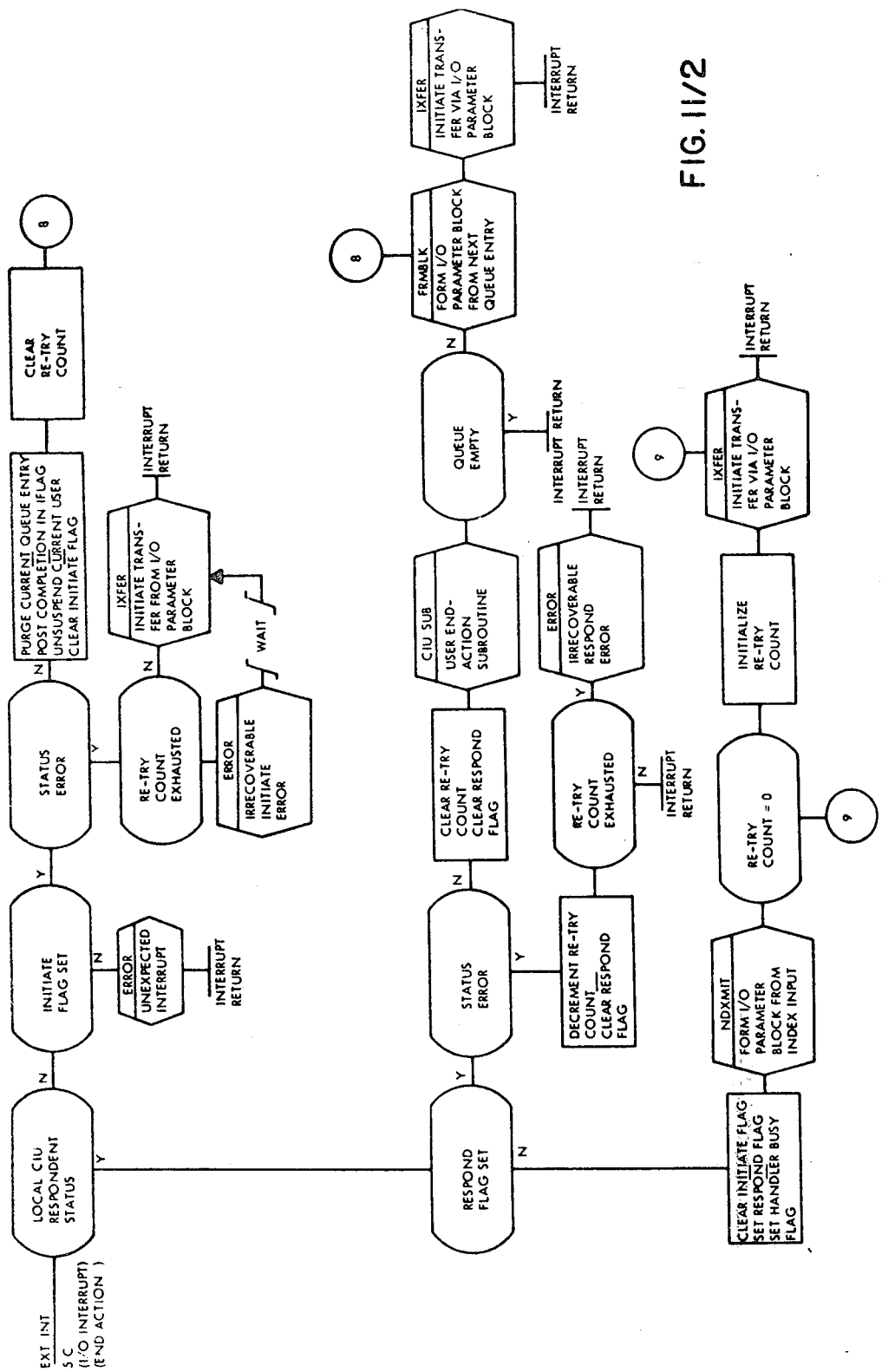
FIG.11/2

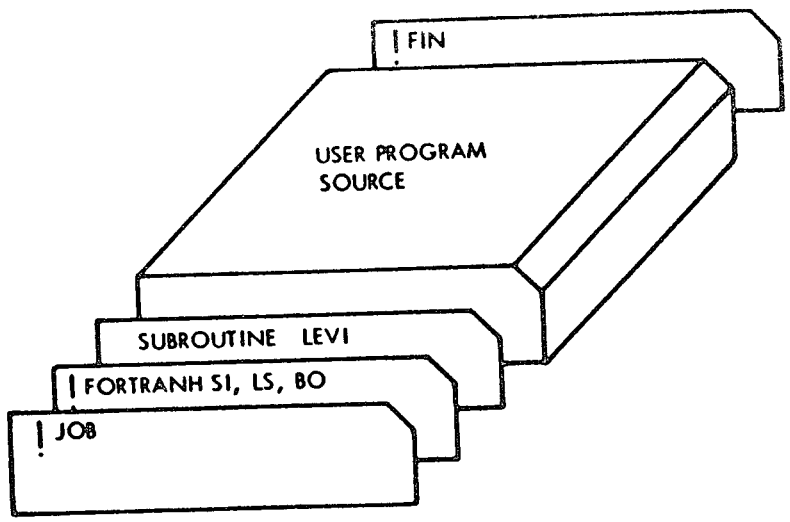
EX 1. OBTAIN BINARY CARD OBJECT MODULE FOR SUBLEVEL PRIORITY 1. FORTRAN EXAMPLE
FIG. 12/1
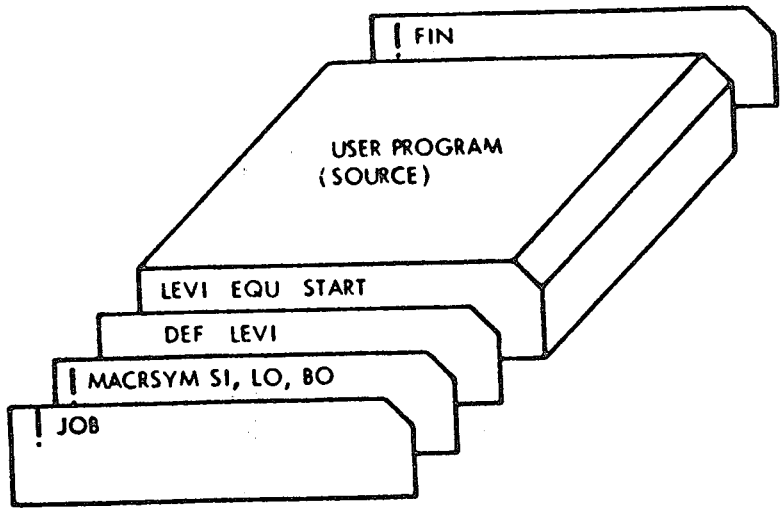
EX 2. OBTAIN BINARY CARD OBJECT MODULE FOR PRIORITY 1 MACRO SYMBOL EXAMPLE
FIG. 12/2

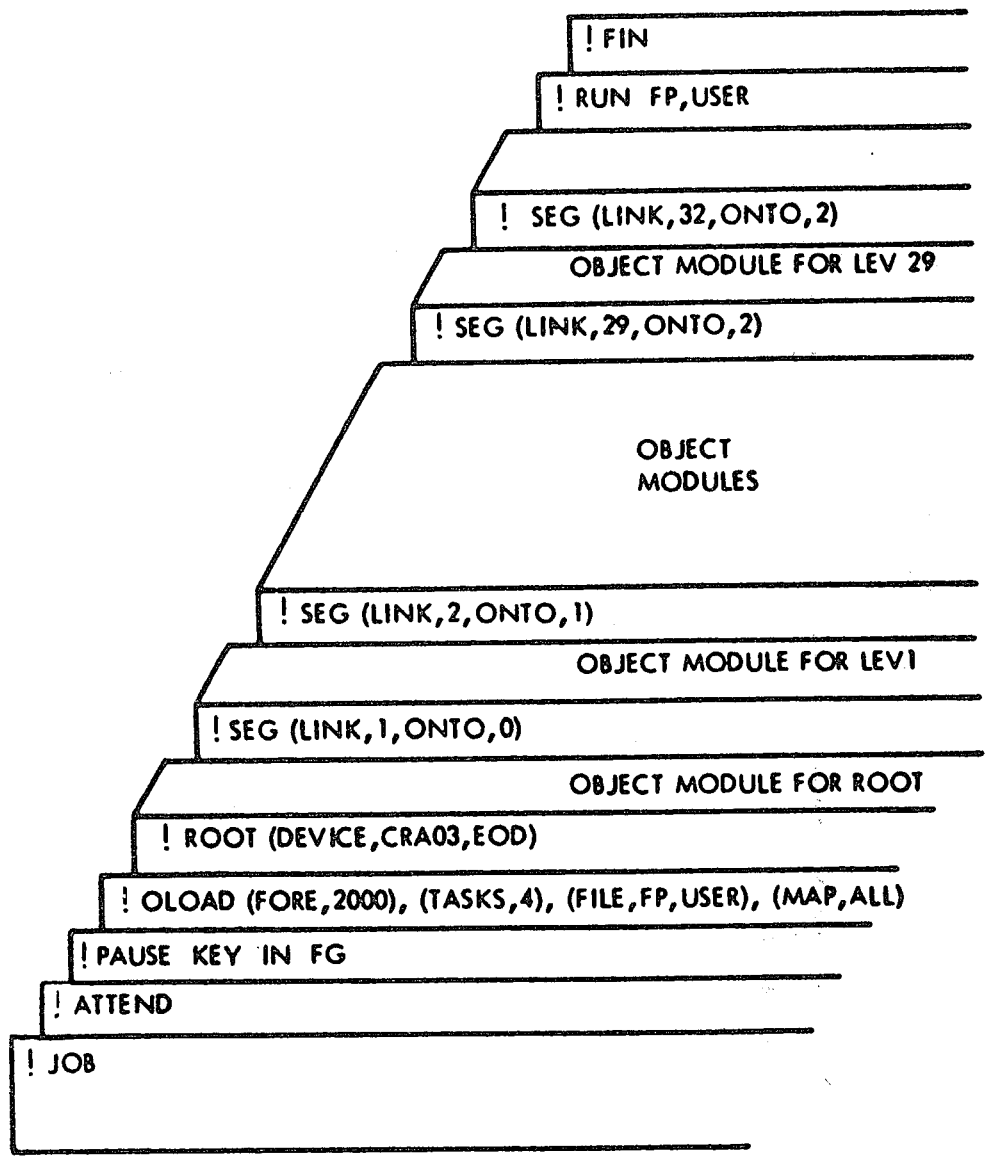
EX 3. LOAD PROGRAM FROM BINARY CARD OBJECT MODULES ONTO USER DEFINED FILE AND EXECUTE IN THE FOREGROUND ALL PRIORITIES BEYOND LEV 2 EXECUTE IN THE OVERLAY AREA.
FIG.12/3

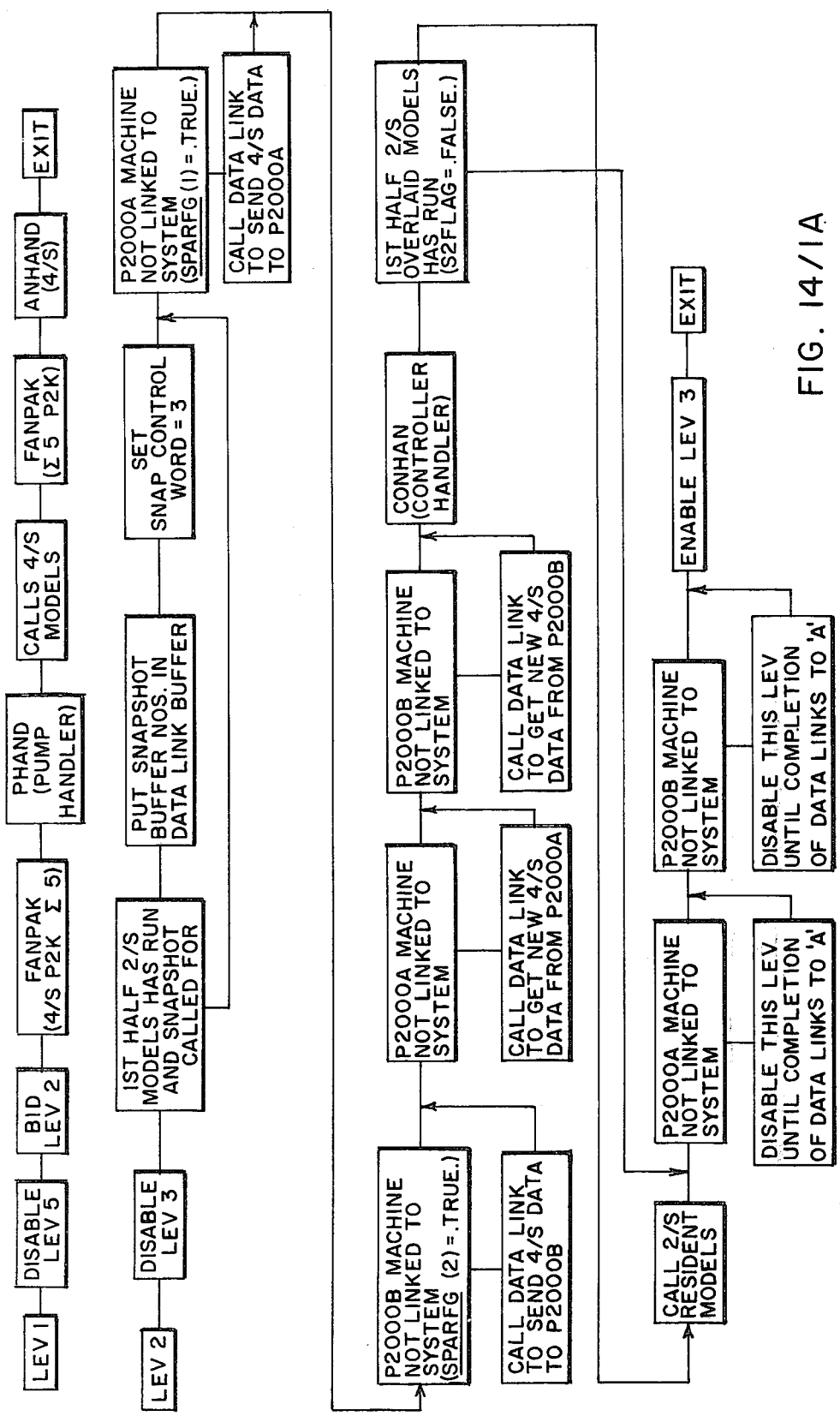
FIG. 14/1A

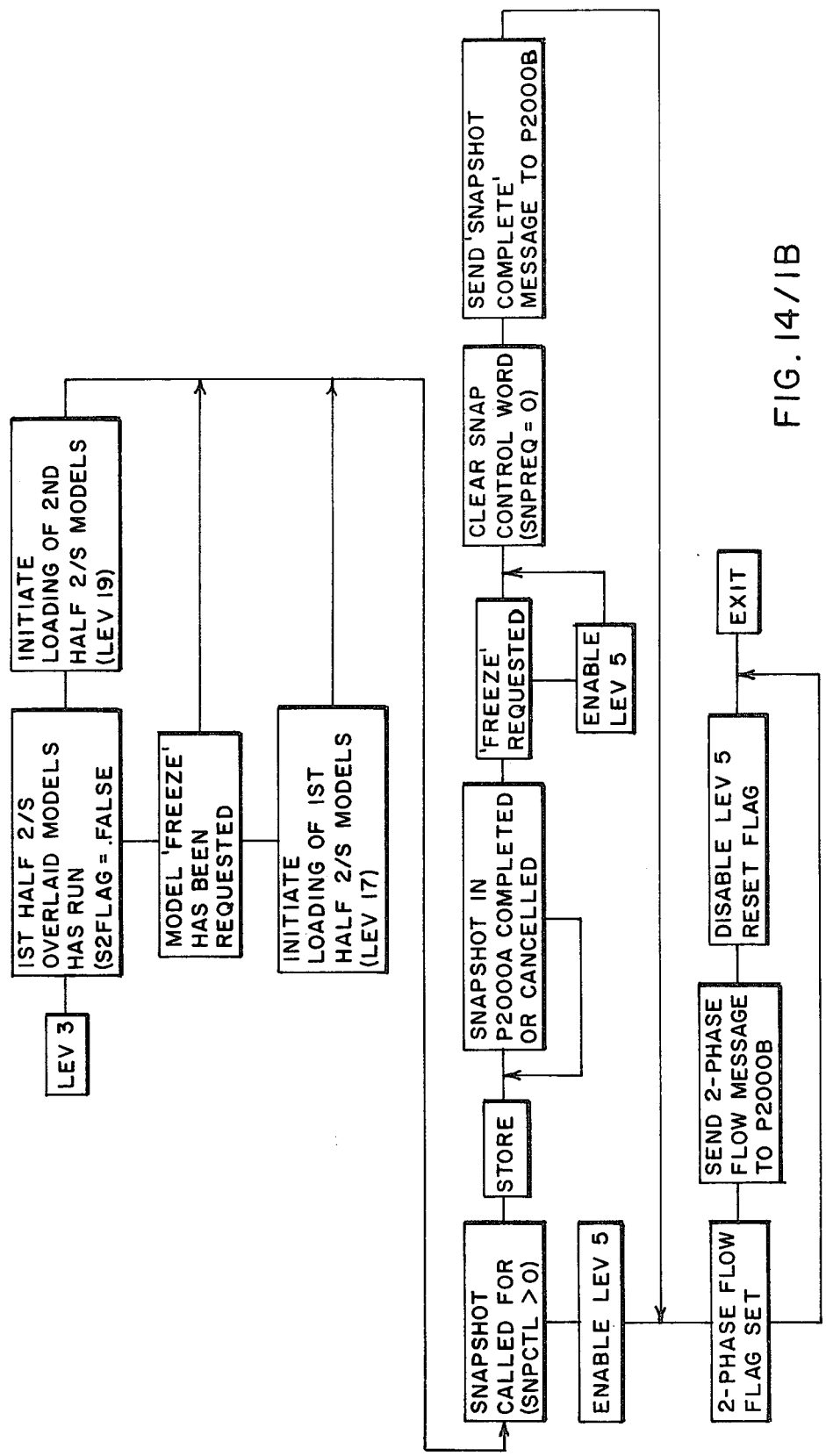
FIG. 14/1B

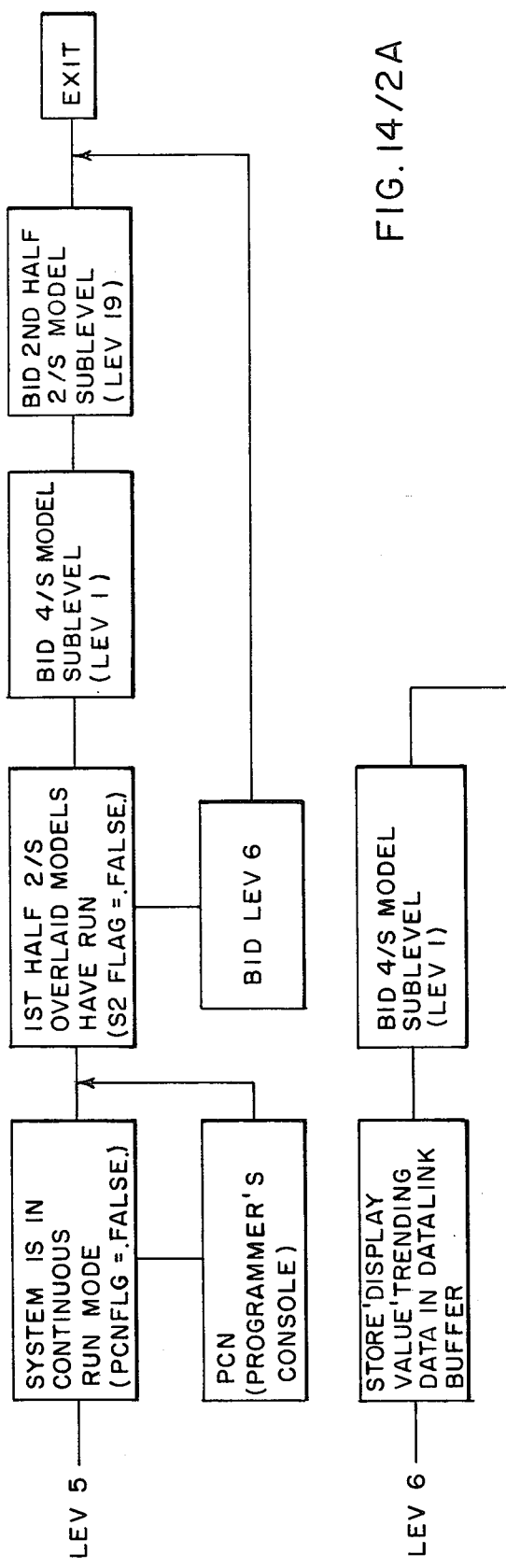
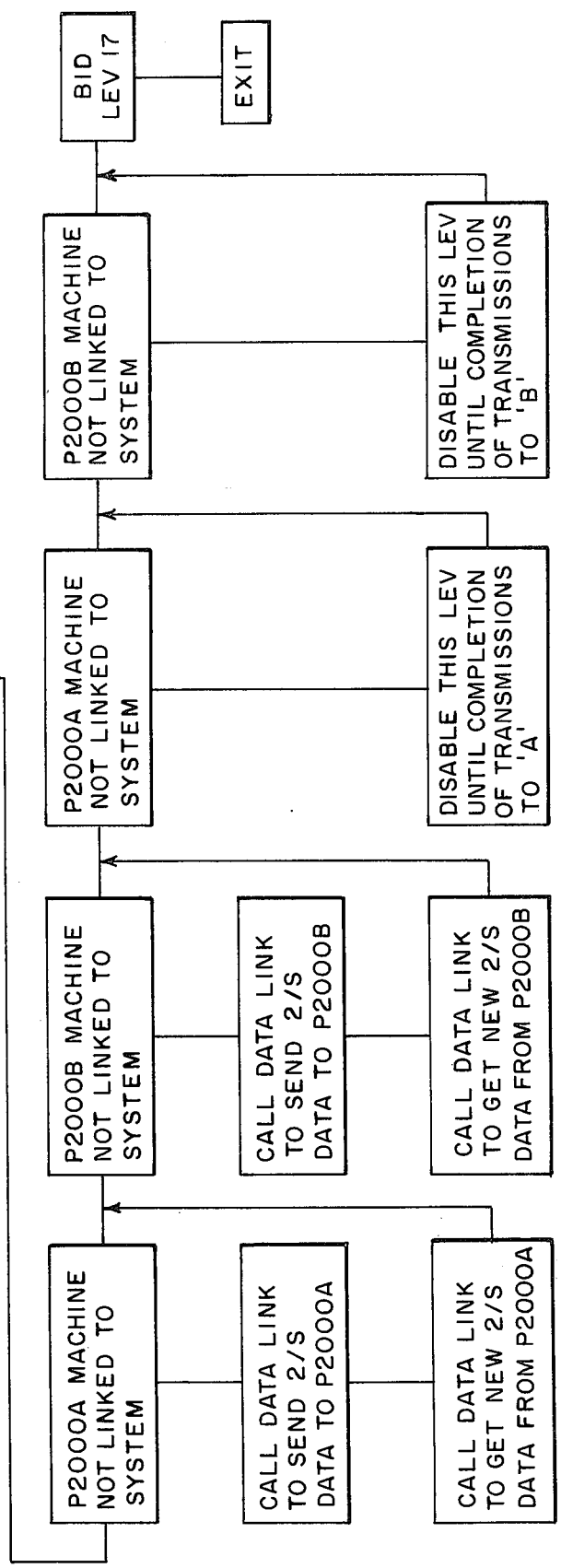
FIG. 14/2A

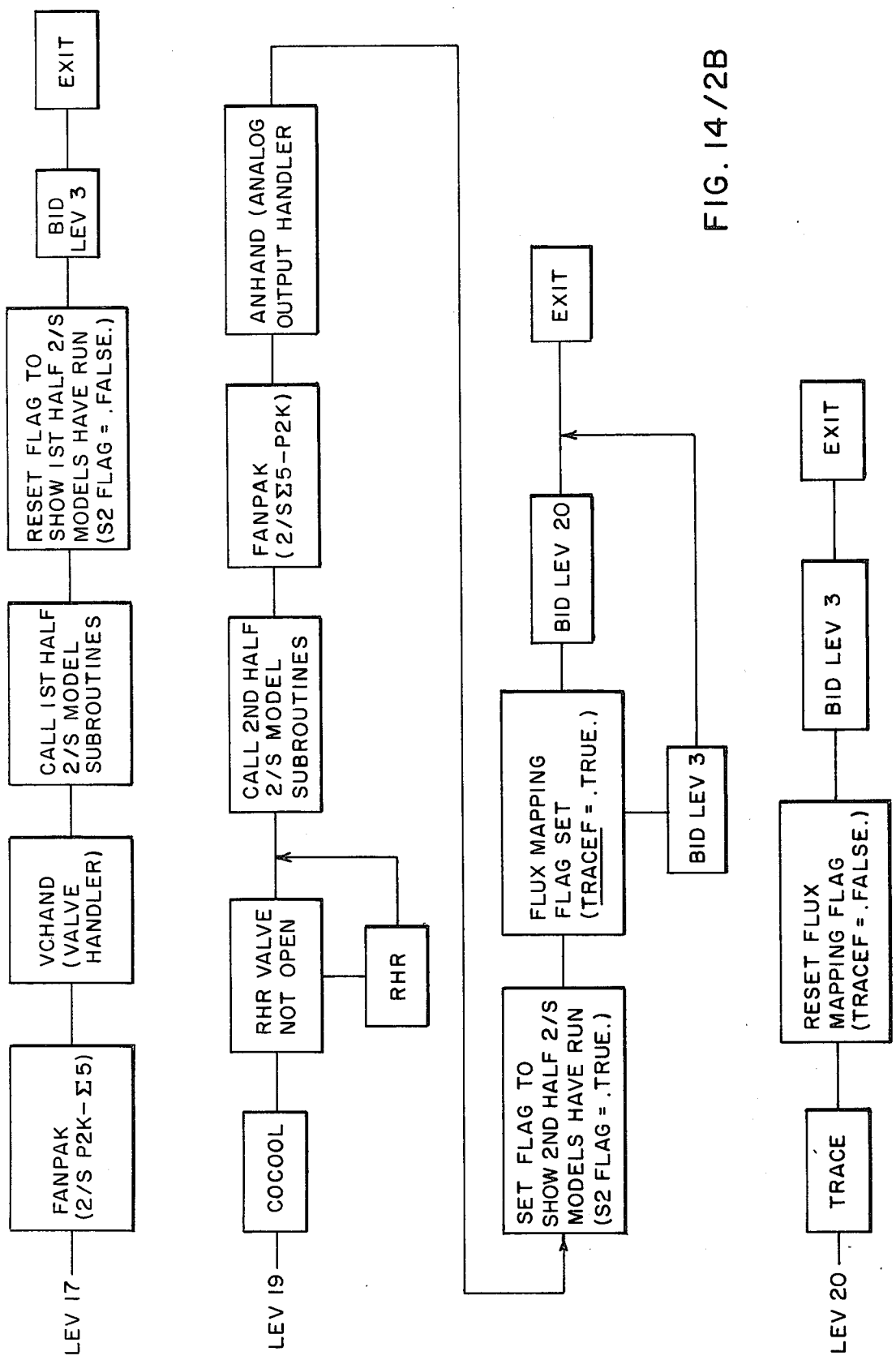
FIG. 14/2B

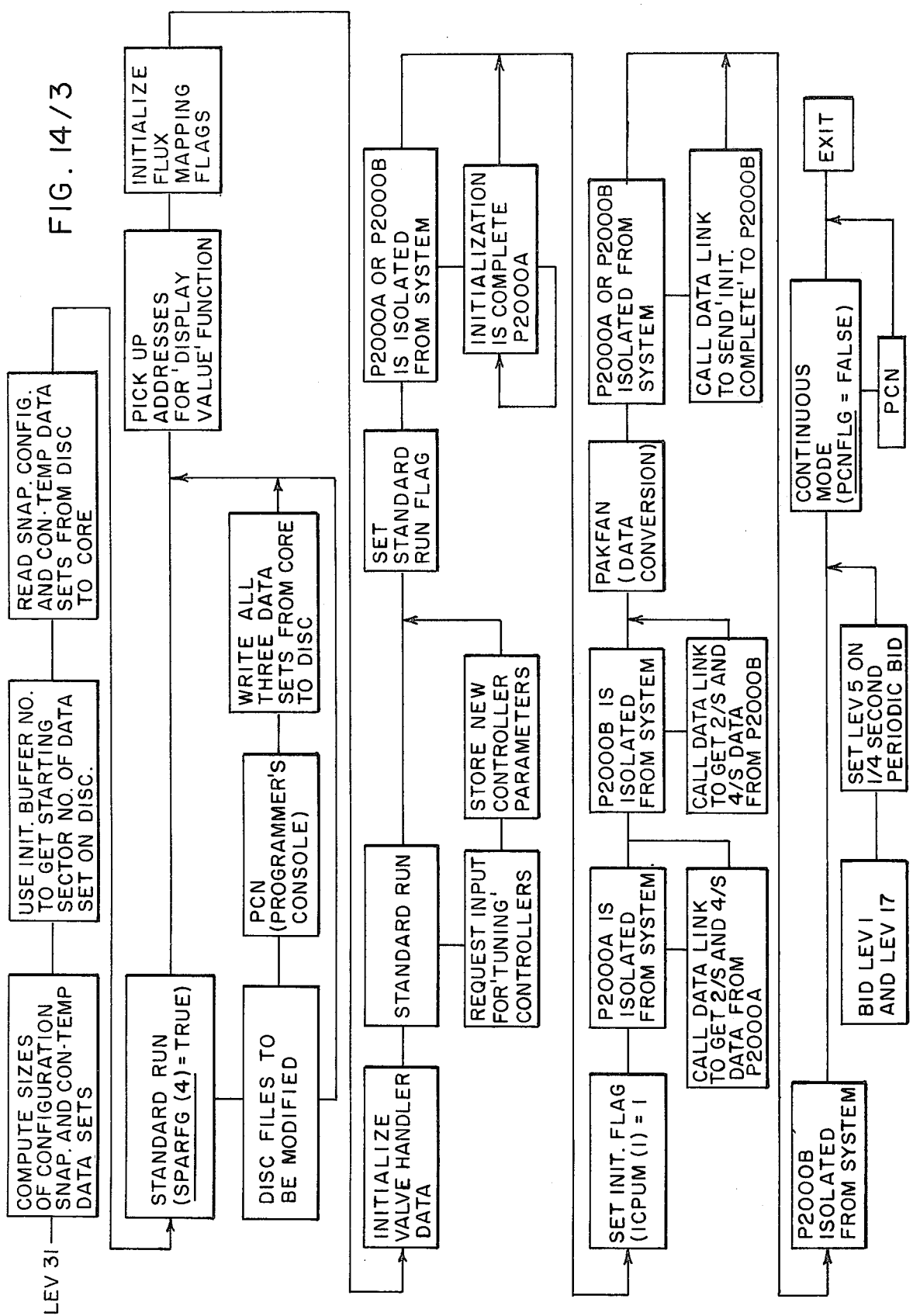
FIG. 14/3

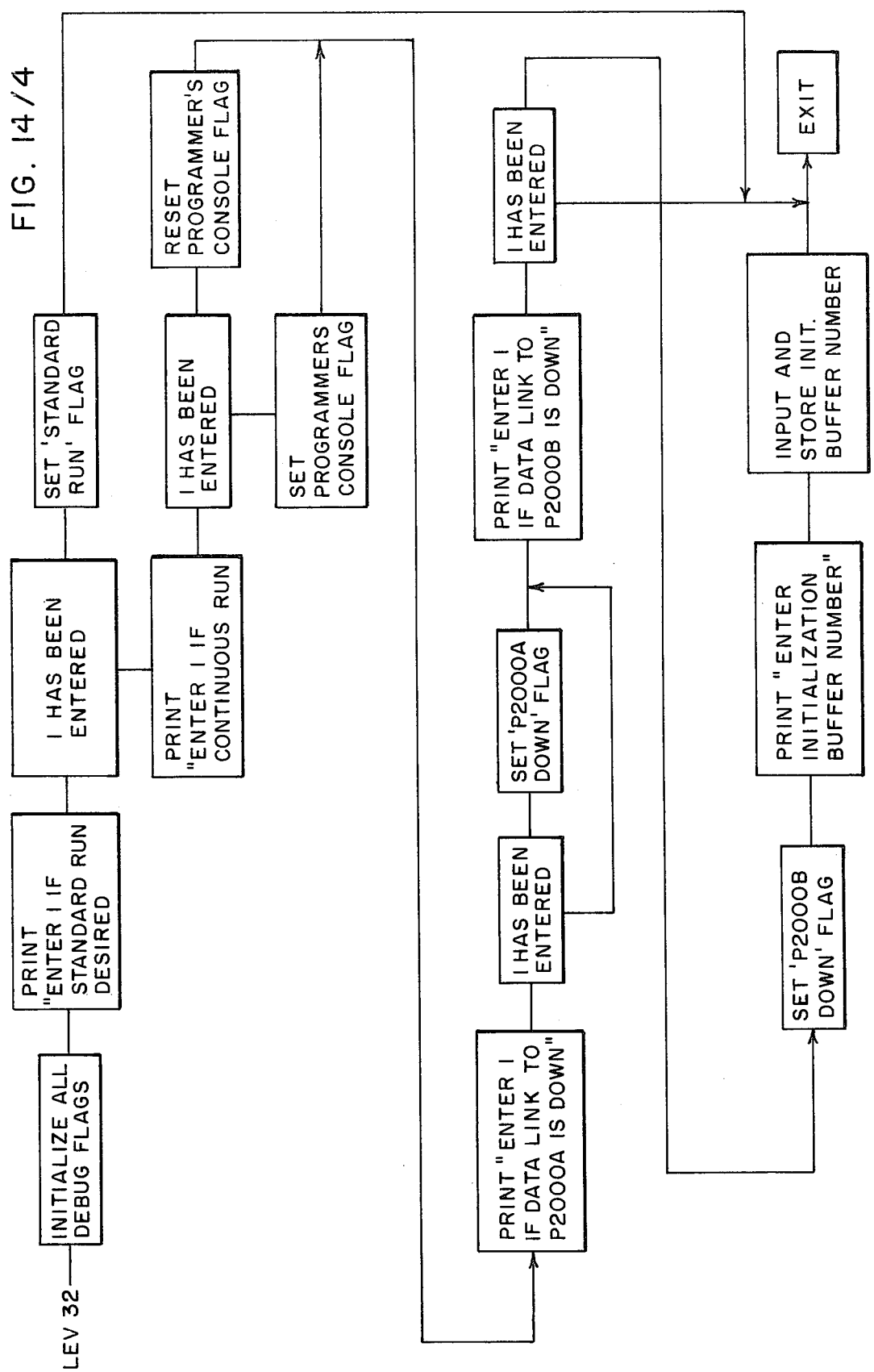

NUCLEAR POWER PLANT TRAINING SIMULATOR SYSTEM AND METHOD

CROSS REFERENCE TO RELATED APPLICATIONS

Reference is made to the following concurrently filed and related patent applications which are assigned to the present assignee:

1. Ser. No. 333,901 entitled "Training Simulator For A Nuclear Power Plant" and filed by G. L. Gregg, R. E. Putman and J. W. Gomola on Feb. 23, 1973.

2. Ser. No. 335,295 entitled "Nuclear Power Plant Training Simulator Modeling Organization And Method" and filed by W. H. Alliston on Feb. 23, 1973.

3. Ser. No. 335,181 entitled "Training Simulator For Nuclear Power Plant Reactor Monitoring" and filed by W. H. Alliston, F. R. Czerniejewski and B. A. Mutafelija on Feb. 23, 1973.

4. Ser. No. 335,298 entitled "Training Simulator For Nuclear Power Plant Reactor Control Model And Method" and filed by F. R. Czerniejewski on Feb. 23, 1973.

5. Ser. No. 335,294 entitled "Training Simulator For Nuclear Power Plant Reactor Coolant System And Method" and filed by W. H. Alliston and A. A. Desalu on Feb. 23, 1973.

6. Ser. No. 335,285 entitled "Engineered Safeguards Systems And Method In Nuclear Power Plant Training Simulator" and filed by A. A. Desalu on Feb. 23, 1973.

7. Ser. No. 335,391 entitled "Fluid Distribution Network And Steam Generators And Method For Nuclear Power Plant Training Simulator" and filed by W. H. Alliston, S. J. Johnson and B. A. Mutafelija on Feb. 23, 1973.

8. Ser. No. 335,183 entitled "Training Simulator And Method For Nuclear Power Plant Heater And Non-Linear Modeling" and filed by B. A. Mutafelija on Feb. 23, 1973.

9. Ser. No. 335,293 entitled "Secondary System Modeling And Method For A Nuclear Power Plant Training Simulator" and filed by S. J. Johnson on Feb. 23, 1973.

10. Ser. No. 335,184 entitled "Data Communication And Method For Real-Time Plural Computer Configuration" and filed by F. G. Willard, N. Slavin and L. S. Schmitz on Feb. 23, 1973.

BACKGROUND OF THE INVENTION

The present invention relates to the full-scope real-time simulation of the dynamic operation of a nuclear powered electrical generating plant for training plant operators.

The increasing demand for well-trained power plant operators together with the complexity of modern day power plants, has led to the realization that the simulator is the most effective tool for such training.

Also, with advancements in nuclear power plant technology, experienced operators from time-to-time need retraining in order to be competent. An actual nuclear plant cannot provide the operator with the required experience, such as starting up, changing load, and shutting down, for example, except after years of experience; and even then, it is unlikely that he would observe the effect of important malfunctions and be able to take the best corrective procedures.

Although simulators have been used for many years, in power plant design, it is only recently that they have been used for power plant operator training. An article in the July 22, 1968 issue of "Electrical World" entitled "Nuclear Training Center Using Digital Simulation" briefly describes the installation of a boiling water reactor plant simulator. An article in the same publication in the Oct. 6, 1969 issue entitled "Huge Simulator to Ready More Reactor Operators" discusses the proposed installation of a pressurized water reactor simulator. In Volume 10, No. 5, of the publication "Nuclear Safety" published during September and October, 1969 is an article entitled "Training Nuclear Power Plant Operators With Computerized Simulators"; and in the June, 1972 issue of the publication "Power Engineering" there is an article entitled "Simulators" which describes a number of power plant operator training simulators presently in use or proposed.

Design simulators usually cover only a small part of the process, and may run slower than real-time; while training simulators must operate and respond in a manner identical to the actual plant. A design simulator may involve only a narrow range of conditions; while a training simulator must simulate from "cold" shutdown to well beyond normal operating conditions. A design simulator usually involves only the major process, while a training simulator should cover every auxiliary system with which the plant is concerned.

Training simulators presently in use for operator training, which are more or less complete in their simulation, utilize a digital computer that is connected to control consoles that are identical in operation and appearance to the plant being simulated. Also, an instructor's console is connected to control the simulator, introduce malfunctions, and perform other duties useful for training purposes. These computers have been of the same type used for aircraft training in some instances, and process control type in another.

Full scope simulators, which involve the entire range of operation under normal, abnormal, and emergency conditions and simulate the entire plant from the reactor to the generator including all the auxiliary systems, involve in the neighborhood of from four thousand to five thousand contact inputs and outputs. The many interconnected systems and subsystems require thousands of calculations every fraction of a second for effective simulation.

In a general purpose digital computer, a monitor initiates the execution of certain required functions at discrete time intervals. In the simulation of a nuclear powered electrical generating plant for training purposes, these functions should briefly include, periodically transferring information from the control panels to appropriate data blocks, performing arithmetical operations to calculate physical values, and transferring the calculated information to output storage blocks for operating the indicating devices. Such functions further should include transferring data between individual computers, if there is more than one, and converting such data from one format to another either before or after transmission to save transmission time. The execution of some of the functions consumes the same amount of time during each time period. However, the execution of other functions can vary substantially from one time period or step to the next. Also, some of the functions are required to be executed during each periodic time interval, while others only need be executed at certain times. In some instances, it may be possible that the actual execution of more than one function can occur concurrently; and in other instances, the execution of one function may depend upon the completion of another function.

A conventional method of effecting such a full scope simulation is to utilize a high speed process control or aircraft training type computer and merely repeat the various functions sequentially. With such an arrangement, a repetitive calculation rate of one-tenth of a second, for example, can provide an effective simulation. However, even by utilizing a computer with such a fast calculation rate, the simulation of a full scope nuclear powered electrical generating plant still requires for certain moderate performance computers that some of the less active simulation or model calculations be performed at a much slower repetition rate, and limit also the completeness of such a simulation.

At times, during the operation of the simulator, particularly under steady-state conditions, the total time consumed during each periodic time interval for required calculations may be less than the actual time allotted. At other times, such as during start-up, or during periods of malfunction, the total time required for a complete handling of the calculators may exceed the time interval. Thus, it is desirable to so arrange the handling of the various functions that the time period or time step is used in an efficient manner with no waiting between functions during each periodic time interval. At the same time, it is still necessary to provide sufficient time during each time period for the completion of all calculations under extreme circumstances. In the organizing of the control functions, it is also desirable to obtain the maximum overlay possible; that is, to process the data in such a manner that the maximum number of functions is being executed concurrently while still providing for the proper sequence of operation. The complexity of such a problem is increased, particularly with a multi-computer arrangement where the data must be transmitted between two or more different computers with different types of program language and word size, for example.

It is desirable for economy in computer speed and calculations to utilize a time step that is as slow as practicable while still permitting stability and realism. During each quarter of a second, for example, simulation calculations can be made and the data transferred between input/output devices and data storage blocks. Also, the simulation or model routines can be executed during each quarter of a second time step to produce the output data. Further, if all of the functions should not be completed by the end of each time step, it is desirable that the next time step commence at the instant such functions are completed. In other words, the simulation cycle should be able to slip without losing any calculations, and then catch up when the calculation time step is normal. Although during each time step functions can be initiated in sequence, it is desirable, where possible, to carry out some functions concurrently. Also, different simulation calculations can be executed or run during each time interval; that is, some of these calculations can be run in alternate time steps. Further results of such calculations can be then transmitted during alternate time steps. It is also desirable that the computer system organization provide for still other simulation calculations to be executed during each time interval when requested by an event, such as the operation of a lever, for example.

SUMMARY OF THE INVENTION

In accordance with the broad principles of the present invention, a system and method which controls the handling of data in the simulation of a nuclear power plant utilizing apparatus wherein a plurality of control devices corresponding to simulated plant control devices provide input data to a digital computer which calculates simulation data to provide output data to indicating devices for monitoring the operation of the plant, includes means for initiating the various functions at periodic time intervals, means controlled by the functions in a priority processing structure of the computer to commence each succeeding time interval when all functions are completed. The priority processing structure is so constructed that the transmission of data and the simulation calculations occur concurrently. In one aspect using a plural computer configuration, the priority processing structure of one of the computers is so structured to control directly or indirectly the processing of the data which is used in the entire computer organization.

BRIEF DESCRIPTION OF THE DRAWINGS

FIGS. 10/1 through 10/5 inclusive show the flow charts for the sublevel processor of the C machine;

FIGS. 11/1 through 11/3 inclusive are flow charts of the data link handler routine of the channel interface units of FIG. 2;

FIGS. 12/1 through 12/3 inclusive are examples of binary card object modules which are combined to form a foreground program load module;

FIGS. 14/1 through 14/4 inclusive show the flow charts for the simulator programs operation of the C machine;

GENERAL DESCRIPTION OF SIMULATED NUCLEAR POWER PLANT

Figure 1:
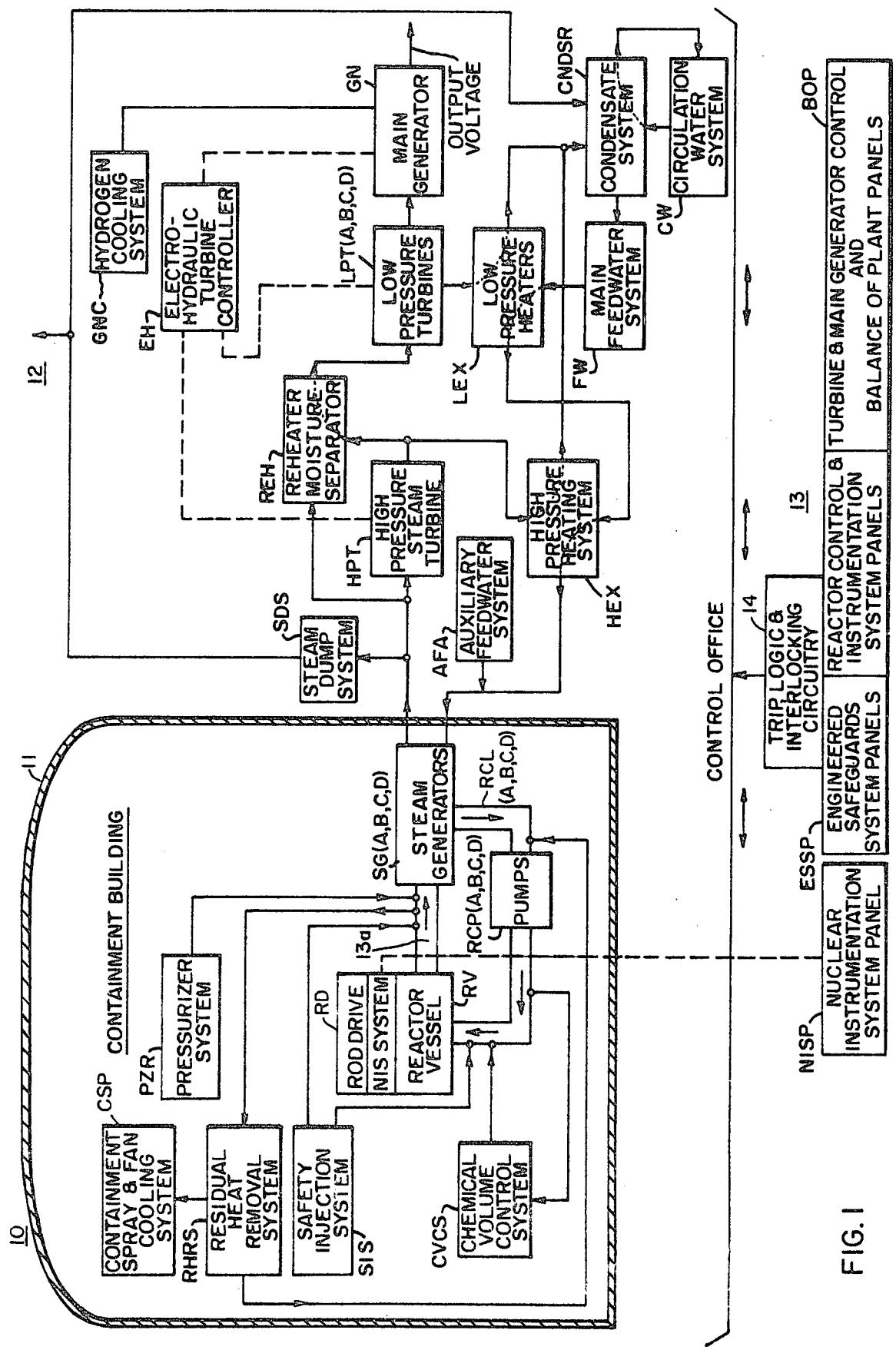
FIG. 1 shows a schematic block diagram of a nuclear powered electrical generating plant that is simulated in accordance with the present invention.

Referring to FIG. 1, the preferred embodiment of the invention is described in connection with the simulation of a nuclear power plant, in this case a four loop pressurized water reactor power plant. Such a plant includes a primary system generally referred to as 10 which is housed in a containment building 11, a secondary system, generally referred to as 12, and a control office that includes control and indication panels 13 for operating and monitoring the various elements in the power station. The plant itself is described herein in a general sense to an extent which will aid in understanding the invention. More detail on the plant is ascertainable from the more detailed invention description herein. Extensive background information on nuclear plants of various kinds is widely available in prior patents and publications. Certain invention features are applicable to nuclear plant types other than the pressurized water type.

The primary system includes a nuclear reactor housed in a reactor vessel RV and in this instance four closed reactor coolant loops RCL (A, B, C, and D), connected in parallel to reactor vessel RV. Each loop contains a reactor coolant pump RCP (A, B, C, and D) and a steam generator SG (A, B, C, and D). The reactor vessel RV, reactor coolant loop piping RCL, pumps RCP, and primary side of steam generators SG, all form what is referred to as a reactor coolant system RCS. The primary system 10 also includes an electrically heated pressurizer system PZR and certain auxiliary systems hereinafter described.

High pressure water circulates through the reactor vessel RV to remove the heat generated by a nuclear chain reaction within a fuel arrangement disposed in the reactor. This heated water exits from the reactor vessel RV and passes via the coolant loop piping RCL to the steam generators SG. In the steam generators SG, the coolant water gives up its heat to the feedwater in the secondary side of the steam generator SG to generate steam for a turbine driven electrical generator GN. The reactor coolant cycle is completed when the coolant is pumped back to the reactor vessel RV for reheating in the nuclear reactor.

Rod drive system RD is used to control reactor power level and consists of clusters or banks of movable cylindrical neutron absorber rods. The absorber rods move within guide tubes in certain fuel assemblies in the reactor fuel arrangement. The reactor coolant pumps RCP are vertical single stage mix flow pumps of the shaft seal type; and are designed so that adequate coolant flow is maintained to cool the reactor core adequately under all conceivable circumstances. The steam generators SG are vertical U-tube units that contain integrally therewith, in the secondary side, moisture separation equipment that reduces the moisture content of the steam to one-quarter percent or less. The electrically heated pressurizer PZR connected to one of the four reactor coolant loops RCL maintains the reactor coolant system RCS pressure during normal operation, limits the system coolant pressure variation during plant load transients, and keeps the system coolant pressure within design limits during abnormal conditions.

The reactor operating level is controlled inherently by a negative temperature coefficient of reactivity of the water; by control rod cluster positioning as already indicated; and by a soluble neutron absorber, such as boron in the form of boric acid. The boric acid is inserted into the coolant during cold shutdown, partially removed during startup, and adjusted in concentration during the life time of the fuel in the core to compensate for such effects as fuel consumption, and accumulation of fission products, which tend to slow the nuclear chain reaction.

The primary system includes engineered safeguard systems, ESS including chemical and volume control system CVCS, safety injection system SIS, residual heat removal system RHRS, containment spray and fan cooling system CSP, and an accumulator discharge system (not shown) which is described in detail in connection with the description of the individual models.

The chemical and volume control system CVCS performs a number of functions, such as filling the reactor coolant system RCS, providing a source of high pressure water for pressurizing the system RCS when cold, maintaining the water level in the pressurizer system PZR when the RCS system is hot, reducing the concentration of corrosion and fission products in the reactor coolant, adjusting the boric acid concentration of the reactor coolant, and providing high pressure seal water for the seals of the reactor coolant pumps RCP.

The residual heat removal system RHRS portion of the engineered safeguard systems ESS transfers heat energy from the reactor core and the system RCS during plant shutdown and refueling operations. Components in the residual heat removal system RHRS are also employed in conjunction with the safety injection system SIS.

The safety injection system SIS supplies borated water to the system RCS to limit the fuel rod cladding temperature in the unlikely event of a loss of coolant accident. Also, the system SIS functions to provide a means of introducing a spray of borated water into the containment 11 as an additional dynamic heat sink. The system SIS includes several independent subsystems characterized by equipment and flow path redundancy. This redundancy assures complete reliability of operation, and continued core cooling even in the event of a failure of any single component to respond actively as intended. For example, during the passive accumulator injection phase of the system operation which is described in connection with the individual models, accumulator tanks rapidly inject borated water into the reactor coolant system automatically when the depressurization of loops RCL causes a reversal of the pressure drop across the accumulator check valves. The accumulators provide rapid cooling of the reactor core for large breaks which would otherwise result in core uncovering and overheating before the electrically driven low head safety pumps of the SIS system are energized and delivering coolant. The low head system of safety injection provides for injection of borated water into the RCL loops for large breaks, which would result in rapid blowdown and depressurization. A high head system for injection into the loops RCL for small breaks is provided for those instances that would result in slow blowdown and depressurization. The low head system utilizes pumps of the residual heat removal system RHRS which takes water from a refueling water storage tank, and pumps borated water through one of the residual heat exchangers, through an injection header and injection lines to each of the reactor coolant loops. The high head safety injection phase utilizes two subsystems which provide extremely rapid response to an SIS system actuation signal, utilizing a boron injection tank and a charging pump of the chemical and volume control system CVCS.

The containment building 11 completely encloses the entire primary system and insures that an acceptable upper limit for leakage of radioactive materials to the environment is not exceeded, even if gross failure of the elements contained therein were to occur. The containment spray system CSP is included in the primary system to limit the pressure in the containment atmosphere to below the containment design pressure, and remove sufficient iodine from the containment atmosphere to limit the radiation doses to safe value. This system delivers NaOH to the space within the containment building 11. The reactor containment fan cooling system portion of CSP which is also part of the containment building monitoring system removes heat from the containment building during normal operation, and during any loss of coolant accident. When a loss of coolant accident is sensed, the fan motors are automatically switched to low speed to provide circulation of the steam-air mixture in the containment building.

The steam generators SG (A, B, C, and D) deliver steam at appropriate pressure and temperature in the secondary system for conversion to mechanical and then to electrical energy in the turbines and the generators, respectively. The secondary steam is additionally used for various operational auxiliary services such as turbine shaft steam seals, turbine drives for main and auxiliary feedwater pumps and steam jet air ejectors.

Steam is admitted to a double flow high pressure turbine HPT that is controlled by governor valves with quick acting throttle or stop valves ahead of them for rapid isolation in an emergency. Four separate pipes convey steam from the governor valves to the turbine nozzle chambers. The steam passes through an impulse blading or control stage and a number of reaction stages of the high pressure turbine HPT; the impulse chamber steam pressur is measured and used as a load measurement for use in reactor control.

On leaving the last row of high pressure blades, the steam has a moisture content of approximately 10%. Thus, the steam is then passed through a moisture separator and reheater REH to improve the turbine efficiency and reduce the low pressure turbine exhaust moisture. The exhaust steam from the high pressure turbine when first passed through the moisture separator portion REH removes approximately 10% of the flow which is extracted as moisture. The remaining 90% flows through steam heated reheater portion of REH where it receives approximately 100°F superheat. The moisture is removed and drained to a heater drain tank (not shown); and the steam which rises above the moisture separator passes over the reheater and is reheated by live steam.

The hot reheated steam is conveyed to the double flow low pressure turbines LPT (A, B, C) the number of which in use can depend on the electrical output required. The low pressure turbine exhaust directs the steam to a condenser CNDSR that has cooling water passing through tubes which condense the steam to water where it is collected in a chamber, called a hot well. The condenser cooling water is controlled by circulating water system CW. The condensate system CNDSR and the feedwater system FW return the condensed steam from the turbine condenser, and the drains of the regenerative feed heating cycle, to the steam generators SG (A, B, C, and D) while maintaining the proper water inventories throughout the cycle.

The feedwater system FW conveys the feedwater through low pressure heaters LEX and then through high pressure heaters HEX to the generators SG. The auxiliary feedwater system AFA is used when the main system is inoperative. These systems automatically maintain the water level of the steam generators SG during both steady-state and transient operation.

The turbine HPT is equipped with an electrohydraulic control system EH comprising a solid state electronic controller and a high pressure fluid supply. The electronic controller computes a control signal based on measured turbine speed, measured first stage steam pressure, and speed and loss reference values established by the dispatcher or initiated at the operator's control panel 13. The control signal is transmitted to the electrohydraulic actuator of each main steam throttle and/or governoring valve to produce the valve positioning needed to meet the reference load. During turbine startup, the throttle valves are position controlled to accelerate the turbine from turning gear or higher speed up to synchronous speed. The high pressure hydraulic fluid system provides the power for all turbine steam control valves, electrohydraulic actuators, and positions the governor valves in response to the electric control signals from the electronic controller. The interceptor valves are also operated by the hydraulic fluid, and they may be position controlled or simply controlled to be either open or closed.

The electrohydraulic control system provides turbine control during all phases of operation by varying the turbine valve openings. Hydraulic cylinders move the valves to the required opening with electrically operated servo-valves controlling the cylinder's position.

The main generator GN operated by the turbine is a hydrogen inner cooled synchronous generator with a water cooled stator and an output voltage of approximately 22 to 25 kV at 60 cycles. The excitation is provided by a shaft driven air cooled brushless exciter. Cooling for the generator is provided by system GNC which circulates hydrogen at a pressure of about 75 psig through the generator GN by fans attached to the generator shaft.

Various plant parameters including reactor parameters, coolant and steam pressures, temperature, and flows and liquid levels in the various systems, as well as the speed of the turbine and electrical output of the generator are sensed and displayed through meters, alarms, and annunciators on the central office panel 13. Among the reactor parameters the position of the rods of the reactor and the state of all operable components are displayed to inform the operator of the condition or state of operation of the nuclear power plant.

The state of operation of the various components of the plant and certain fluid pressures, temperatures, and levels are connected through interlocking and logic circuitry 14 to prevent unsafe operation of selected system components and to trip or shut down the plant under abnormal conditions.

Nuclear instrumentation panel NISP is provided with various recorders, indicators, meters, and selector switches to display the neutron flux values in various sectors of the reactor, both in an axial and radial direction, which function is termed in-core flux mapping.

Also, a portion of the panel NISP displays through meters the flux in various sectors of the reactor vessel RV to inform the operator of the various ranges of nuclear flux, such as source, range, intermediate range, and power range of the reactor during start-up and shutdown, which operation is termed ex-core radiation detection. Further, the temperature of individual fuel rods of the reactor, and the radiation in various parts of the plant are monitored and displayed on the panels NISP. Finally, the auxiliary power to the plant is controlled by a portion of the panel NISP.

GENERAL DESCRIPTION OF SIMULATOR CONFIGURATION

The nuclear power plant simulator according to one embodiment of the invention comprise digital computation apparatus and peripheral equipment operatively connected to control and indication panels which are identical in appearance and wiring to the actual control and indication panels of the four loop pressurized water reactor power plant that is simulated. The general function, structure, and operation of digital computers is set forth in a publication entitled "Electronic Digital Systems" by Mr. R. K. Richards, which was published in 1966 by John Wiley and Sons, Inc. and bears the Library of Congress card catalog number 66–17618, to which reference is made for a detailed description thereof in order to aid in an understanding of the apparatus and methods in carrying out the invention.

Figure 2:
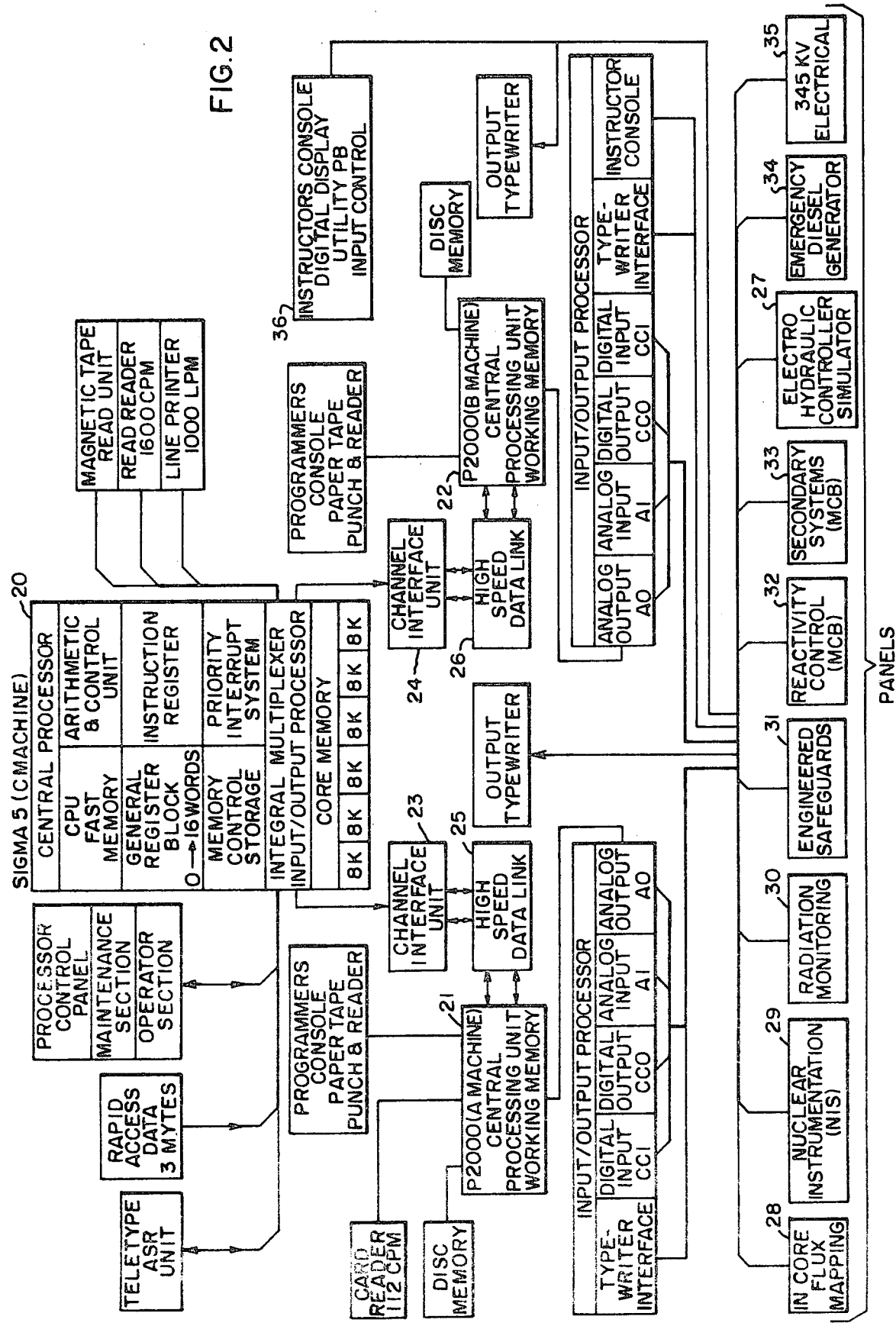
FIG. 2 shows a schematic block diagram of the apparatus used in simulating the operation of the plant shown in FIG. 1.

Specifically, and referring to FIG. 2, the simulation system includes a Sigma 5 digital computer 20 referred to at times in this specification also as the "C" machine and associated peripheral equipment. The Sigma 5 computer system is manufactured and sold by Xerox Data Systems, Inc. and has been in general use for over one year prior to the filing date of this application. For more information on the Sigma 5 computer system reference is made to the appendix.

The simulator also includes digital computers 21 and 22 referred to at times hereinafter also as the "A" machine and "B" machine, respectively and associated peripheral equipment of the type manufactured and sold by Westinghouse Electric Corporation, and which is known as model P2000, and which computers have been in general use for over one year prior to the filing date of this application. The P2000 digital computers 21 and 22 are described in a publication entitled "Prodac 2000 Computer Systems Reference Manual" copyrighted in 1970 by Westinghouse Electric Corporation and bears copyright Registration No. A244775, to which reference is made to aid in an understanding thereof.

The Sigma 5 computer, or C machine provides an extensive arithmetic capability for the power plant simulator. The computers 21 and 22, act as process input/output controllers for the C machine. In practicing many features of the invention, a single computer or other multiple computer arrangements may be employed.

Communication between the A, B, and C machines is provided by a combination of the Xerox Data Systems Model 7650 channel interface units 23 and 24, and high speed data link devices 25 and 26 respectively, described more fully hereinafter. The C machine provides the software control and synchronization for the multiple computer configuration involving the A machine, B machine, and C machine; and the A and B machines in addition to providing the process input/output capability for the C machine also provide a capability for instantaneous simulator responses through their external interrupt system, the processing of all interlock and protection system logic, and the processing of several employed in the simulator models, such as a reactor control rods program. The significant hardware features associated with each of the A and B machines as shown in FIG. 2 included in the appendix. The major C machine hardware subsystems illustrated in FIG. 2 and utilized in the present embodiment of the invention are also included in the appendix to this specification.

The simulation of the electrohydraulic control system EH as depicted in FIG. 1 and represented by a simulator panel portion 27 of FIG. 2 is accomplished in part by the actual analog electrohydraulic controller manufactured and sold by Westinghouse Electric Corporation, which has been in use for more than a year prior to the filing date of this application. The panels 27 through 35 in FIG. 2 provide the same outward appearance and operation as panels in an actual plant and are connected directly through appropriate computer system equipment to the A machine and the B machine.

Instructor's console 36, which provides the control facility to start, stop and manipulate the simulator is connected to software in the B machine.

A basic real time batch monitor (hereinafter referred to as RMB) software system of the C machine is a two partition system designed for normally running simultaneously foreground and background programs. The foreground programs include the system software extension program which are made up of a sublevel processor, data link handler, and disc handler. Such foreground programs also include data conversion routines, and various dynamic models for the simulated system, which include reactor models, primary system models, secondary system models, a valve handler routine, a pump handler routine, and a controller handler routine. In order to permit an economy in core memory requirements, in the present embodiment of the invention the foreground programs and the background programs are not run at the same time.

Figure 3:
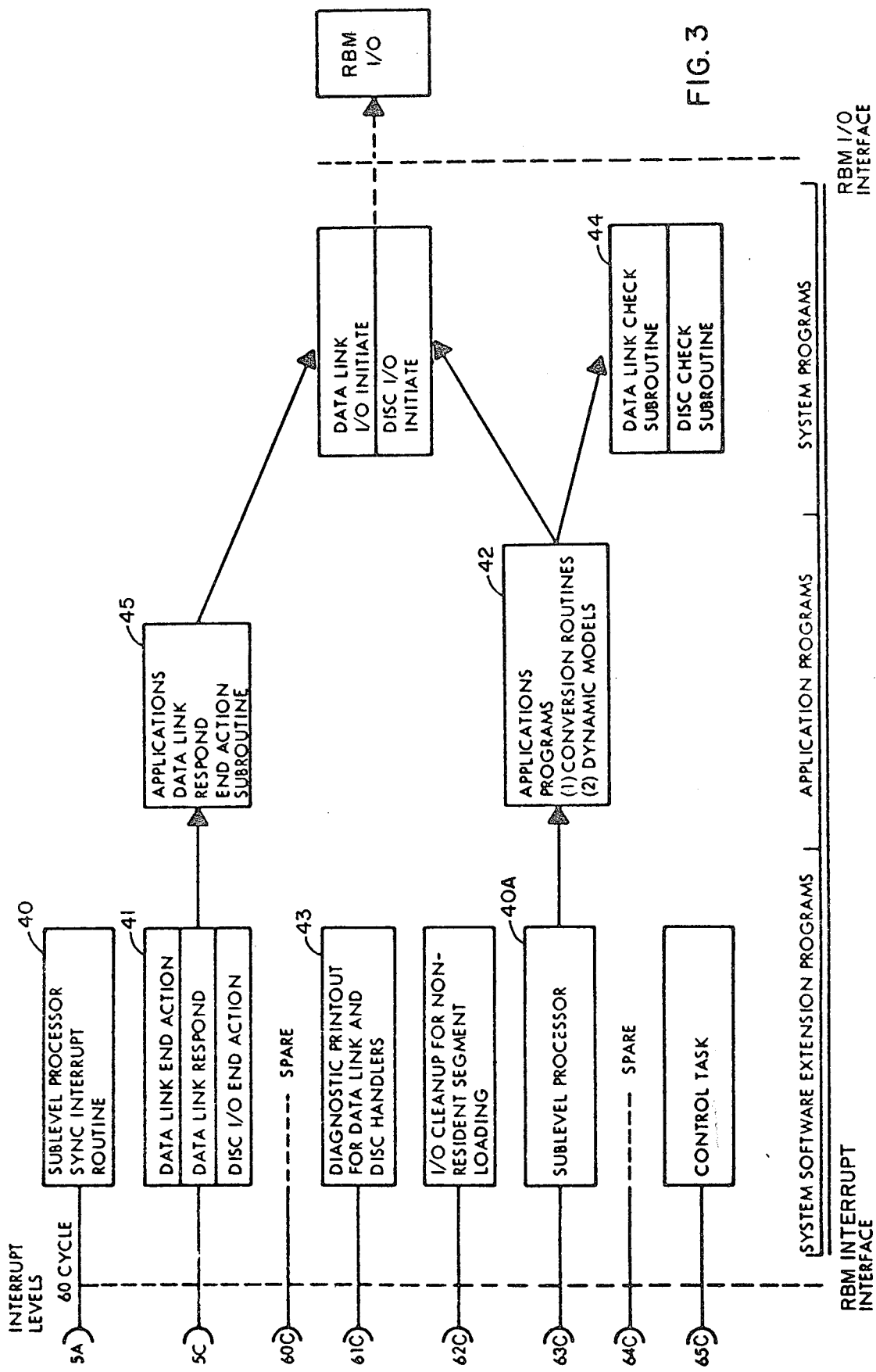
FIG. 3 is a schematic functional block diagram of foreground programs for the C machine shown in FIG. 2.

Referring to FIG. 3 the foreground programs are visualized as being a three layer structure which comprise the system software extension programs, that include the sublevel processor 40 and 40A, and the data link handler and disc handlers 41. Also, such foreground programs include the application programs which are made up of the data conversion routines represented in block 42 that include the logical and integer conversion routines and an analog output handler. Such on-line foreground programs also include the dynamic models referred at block 42.

The sublevel processor 40 and 40A expands an interrupt into 32 sublevels. The periodic order of the execution of the various sublevels enables the synchronization of the three machine (A, B, and C machine) configuration. The disc handlers operate within the RMB file structure and provide a direct access-no wait transfer; and the data link handlers provide the capability of transferring two way information between the C machine and the A and B machines.

The data transmitted among the three computers is of two types, logical and integer. The dynamic models are programs preferably executed mainly on a periodic basis, in this instance one group at four times per second, and a second group at two times per second. Prior to the execution of each of the above groups of programs a request for transmission of data from the A and B machines pertinent to that set of programs is made. After the data is received, and in order to provide usable data for the models, the logical conversion routine must be executed to transform bit logicals to word logicals for use by the models; then the integer conversion routine must be executed to transform 16 bit integers to 32 bit integers; and finally routines which simulate plant pumps, valves, and controllers are run to provide new values for such variables as pump speed and head, valve position, and so forth. In making updated calculations, the pump and valve routines make use of transmitted logicals which have been established by the interlock logic in the A and B machines. The controller routines make use of transmitted raise or lower logicals where applicable and also integer data which represents potentiometer settings on the auto/manual control stations on the control panels. After the execution of each group of model programs, the logical and integer conversion routines are called to perform the reverse process to that previously described. In addition to these routines, an analog output handler must be executed to take the floating point numbers generated by the model for analog outputs, that is for meters, recorders, and so forth, and prepare them for transmission as integer half words to the A and B machines.

The software for the A and B machines perform the function of control and optimization of the input/output communication with the control panels, instantaneous response to operator action, simulation of plant systems such as the plant interlock logic and reactor protection system logic, and reactor control rod and synchroscope simulation. Also, the A and B machine software functions as an interface between the instructor's console 36 (see FIG. 1) and the plant dynamic model. The means for executing the functions for the A and B machine software, is provided by an automatic programming system, hereinafter referred to as PROGEN. The software modules contained within the automatic programming or PROGEN system for the A and B machines include the monitor system, sublevel processor, interpreter and algorithms, digital scan, analog input scan, analog output scan, instructor console control, and the data link handler.

Figure 4:
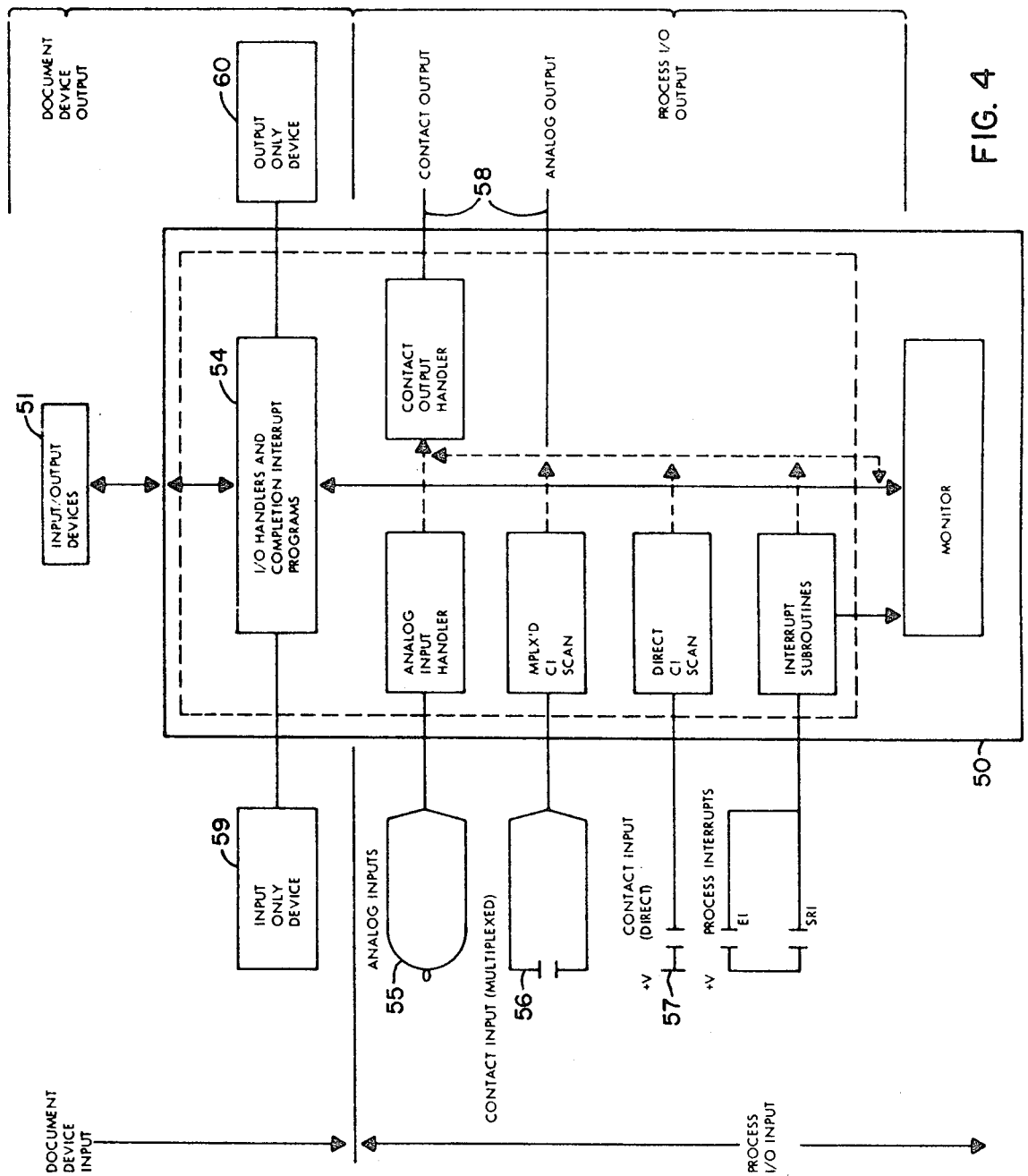
FIG. 4 is a functional block diagram of the monitor structure for the A and B machines shown in FIG. 2.

Referring to FIG. 4 the monitor 50 is a collection of routines which provide for time sharing of the central processing unit (see FIG. 2) and the input/output devices 51. A task scheduler routine in the monitor provides the capability for task scheduling on a priority basis for 16 levels. Input/output handler routine referred to as block 54 implements communication between the central processing unit and the process input/output such as the analog input 55, contact inputs 56 and 57 and outputs 58. The input/output handler 54 also implements communication between the central processing unit and the document devices (see also FIG. 2) 59 and 60, which include a paper tape input/output, a card reader, and a Selectric 735 input/output typewriter. Also, it implements communication with the disc memory. The sublevel processor of the A and B machines expands the priority structure provided by the A and B machine monitors. Each of the sixteen priority task levels may be expanded to 256 sublevels.

Figure 5:
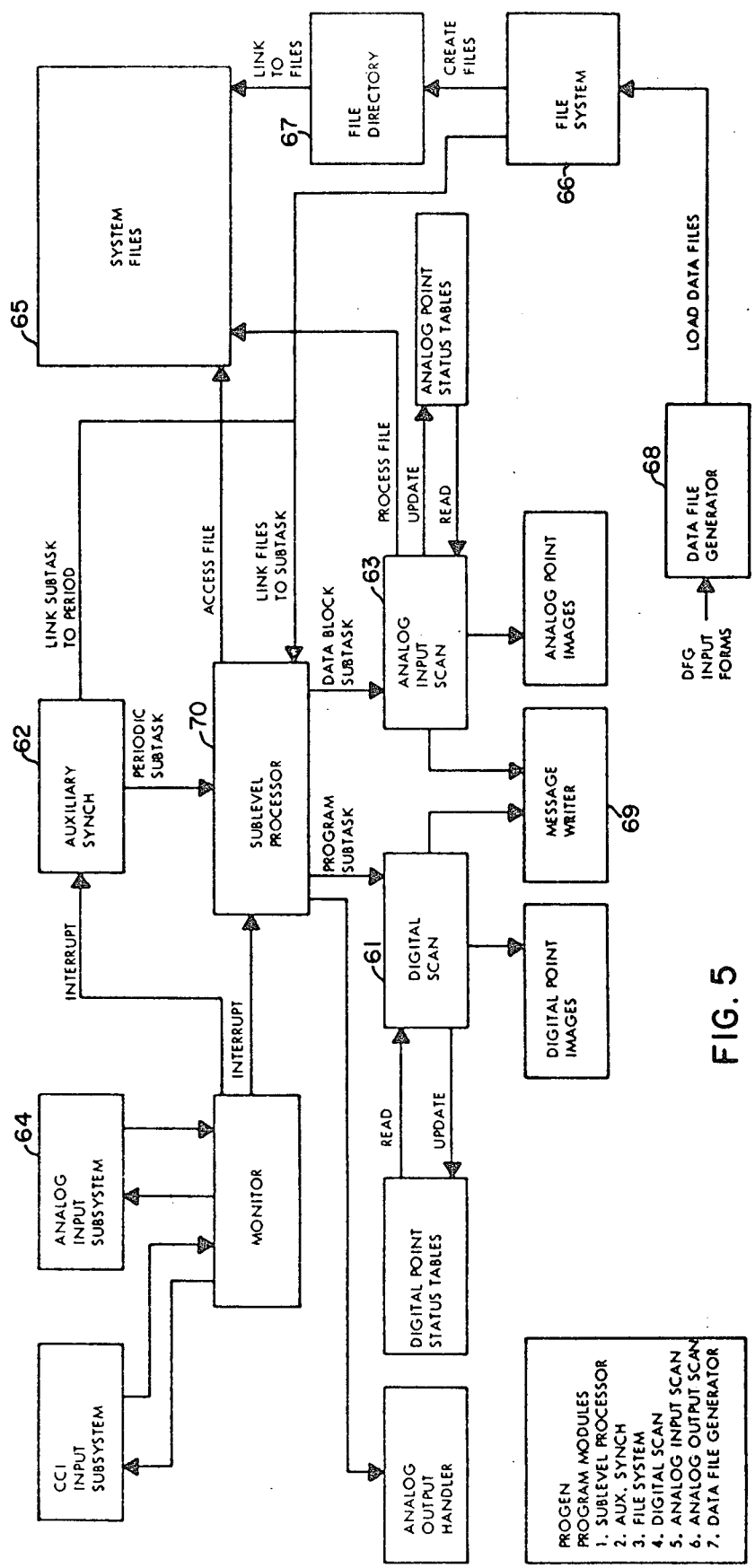
FIG. 5 is a functional block digram of the data acquisition and alarm function routines for the A and B machines.

Referring to FIG. 5, data acquisition and alarm function routines are made up of program modules that include a digital scan 61, which function is actually performed by several programs with each handling a particular block of logicals. The functions performed by each routine are identical, but are performed as individual tasks because of different timing requirements for scanning the different blocks of logical. For example, a routine which scans the multiplex inputs must be run periodically every one-quarter second, and it is therefore triggered by the auxiliary synch routine 62. In contrast, bi-directional contact inputs cause an interrupt to occur which in turn causes a scan routine to eventually be run to scan the block of logicals associated with that particular interrupt.

The digital scan routines read the actual hardware image of all specified contact inputs and update a users image of these points. The points are scanned to detect a change of state. A change of state will, depending on the logical, trigger alarm messages and/or other programs.

The data acquisition and alarm function routines also include an analog scan 63 which calls the analog input handler 64 periodically to input the analog points, scales the input values for use by the models, and produces an alarm message for a point which changes beyond a certain deadband and remains in a stable position for a period of time.

The data acquisition and alarming function relies on a data file system 65 and 66 and 67, in which data files exist for most process variables in the system. The process variables include analog inputs 64, which include analog input points whose values are read into the computer by way of the subsystem hardware; calculated values which are values calculated and stored by a program; logical variables, which are logical values (true or false) as set by a program; and contact outputs, which are contact outputs in the subsystem hardware. The data files 65 contain information such as flags indicating normal status for logical points, alarm flags indicating that, upon change in status of the variable, a message should be printed, and an English description of each variable. The data files 65 are originally written in a PROGEN format and are generated offline by a PROGEN data file generator program 68 and loaded into the computer system by a file loader program.

A message writer program 69 handles communication with the instructor's console typewriters (see FIG. 2). The program 69 enables programs to be serviced with a print-out to continue running instead of going into suspension waiting for a message to be printed.

An auxiliary synchronizer program 62 provides the basic time keeping for all programs which require time-based actions or initiations. This program is actuated at every system base period from the synchronizer interrupt. During each system base period it executes functions which include bidding a sublevel after the expiration of time delay, periodically bidding specified sublevels, counting down active logical time delays, running the time-delay countdown routine in sublevel processor 70, and counting down active contact output (CCO) time delay outputs.

The analog outputs on both the A machine and the B machine are updated at either 2/second or 4/second intervals. The handlers which update the analog outputs are particular sublevels which are bid and run after the analog outputs have been transmitted from the C machine. The actual frequency of running these programs is therefore determined by the frequency that the analog outputs are transmitted from the C machine.

The data link handler routine implements data transfer between the A and B machine and the C machine. The data link handler is capable of accepting request for data transfer from both computers. It has the flexibility of transmitting fixed data blocks with fixed core addresses and also of transmitting fixed length output of data located anywhere in core to and from both the A and B machines. With the exception of the instructor console functions, all data transmission between computers is implemented with fixed length buffers with the transfer initiated by the C machine. The buffer transfer of instructor's console function is not initiated by the C machine, but by the function programs that reside in the A or B machine.

Figure 6:
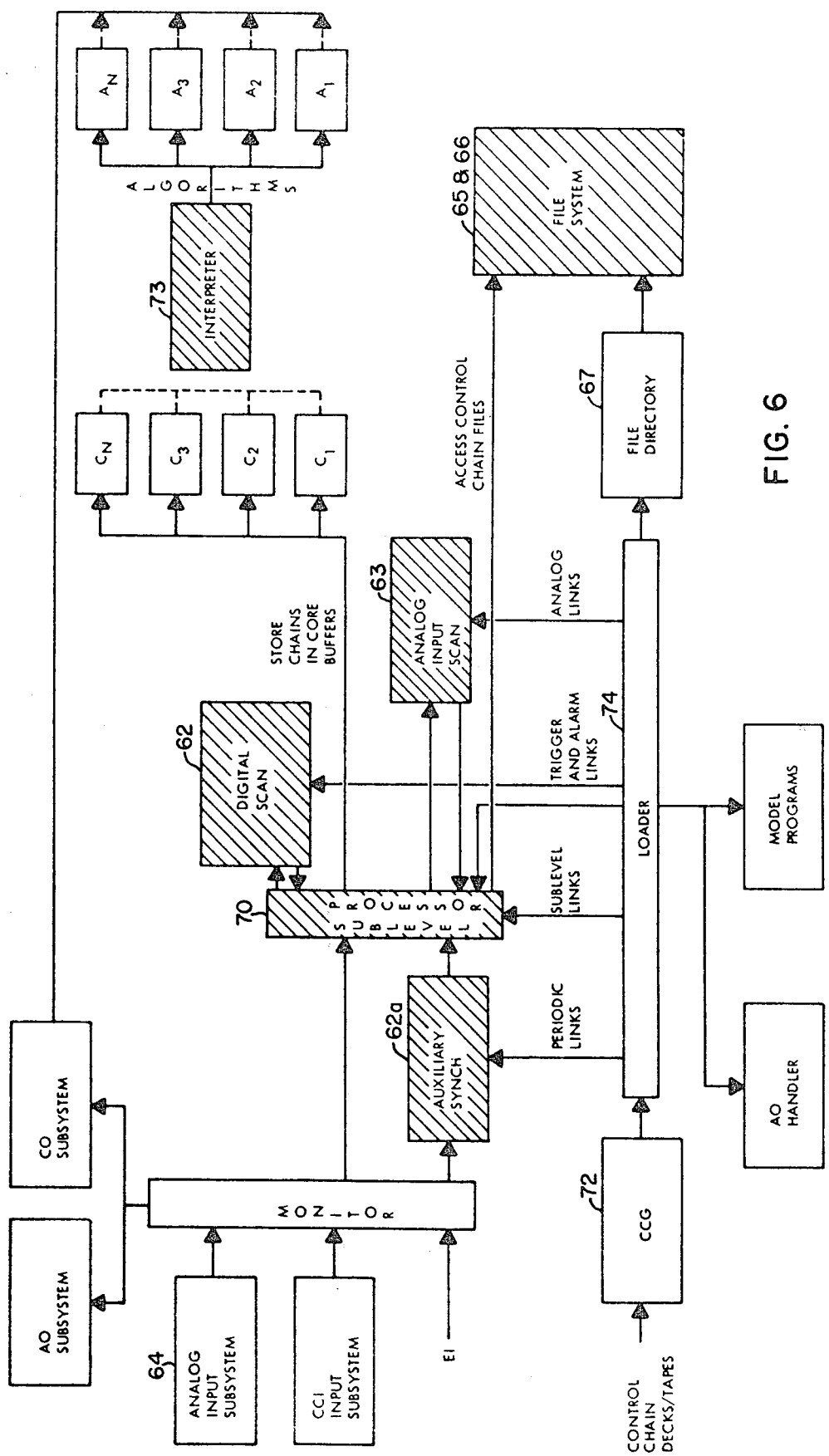
FIG. 6 shows the configuration of the PROGEN application programs.

FIG. 6 illustrates the structure and manner by which the PROGEN system application programs. The previously described data acquisition and alarm system provides the data base for the application programs which comprise assembly language, FORTRAN IV, and PROGEN language routines. Routines written in PROGEN are referred to as chains. This designation is given because the code generated by a PROGEN control chain generator 72 in response to a program writer's input in an interpretive code consisting of a series of links which designate stored algorithms to be executed. All chains are disc resident and are read into core buffers by the sublevel processor 70 when they are scheduled for execution. An interpreter program 73 executes a chain through interpretion of the code and calling of core resident algorithms.

As in the case of data files, the chains are loaded by PROGEN loader 74. The loading process comprises providing links with the auxiliary synchronizer program 62 for those chains which are to be bid periodically, providing links with the sublevel processor 70 on information necessary for execution, providing links where necessary with the digital scan 62 and analog scan 63 routines on triggering and alarming functions, creating entries in the file directory 67, and actually loading the chains in disc files. anywhere in core to and from both the A and B machines. With the exception of the instructor console functions, all data transmission between computers is implemented with fixed length buffers with the transfer initiated by the C machine. The buffer transfer of instructor's console functions is not initiated by the C machine, but by the function programs that reside in the A or B machine.

FIG. 6 illustrates the structure and manner by which the PROGEN system application programs. The previously described data acquisition and alarm system provides the data base for the application programs which comprise assembly language, FORTRAN IV, and PROGEN language routines. Routines written in PROGEN are referred to as chains. This designation is given because the code generated by a PROGEN control chain generator 72 in response to a program writer's input in an interpretive code consisting of a series of links which designate stored algorithms to be executed. All chains are disc resident and are read into core buffers by the sublevel processor 70 when they are scheduled for execution. An interpreter program 73 executes a chain through interpretion of the code and calling of core resident algorithms.

As in the case of data files, the chains are loaded by PROGEN loader 74. The loading process comprises providing links with the auxiliary synchronizer program 62 for those chains which are to be bid periodically, providing links with the sublevel processor 70 on information necessary for execution, providing links where necessary with the digital scan 62 and analog scan 63 routines on triggering and alarming functions, creating entries in the file directory 67, and actually loading the chains in disc files.

The reactor protection system logic, control panel interface logic, flux mapping logic, and synchroscope logic are all written in the PROGEN language. Special routines which model the reactor control rods are written in FORTRAN IV and loaded into the computer system to be operable in the PROGEN system. These routines take data from the control panel and from the C machine to continually calculate the position of the control rods. This information is then transmitted to the C machine and also displayed on the control panels.

Figure 7:
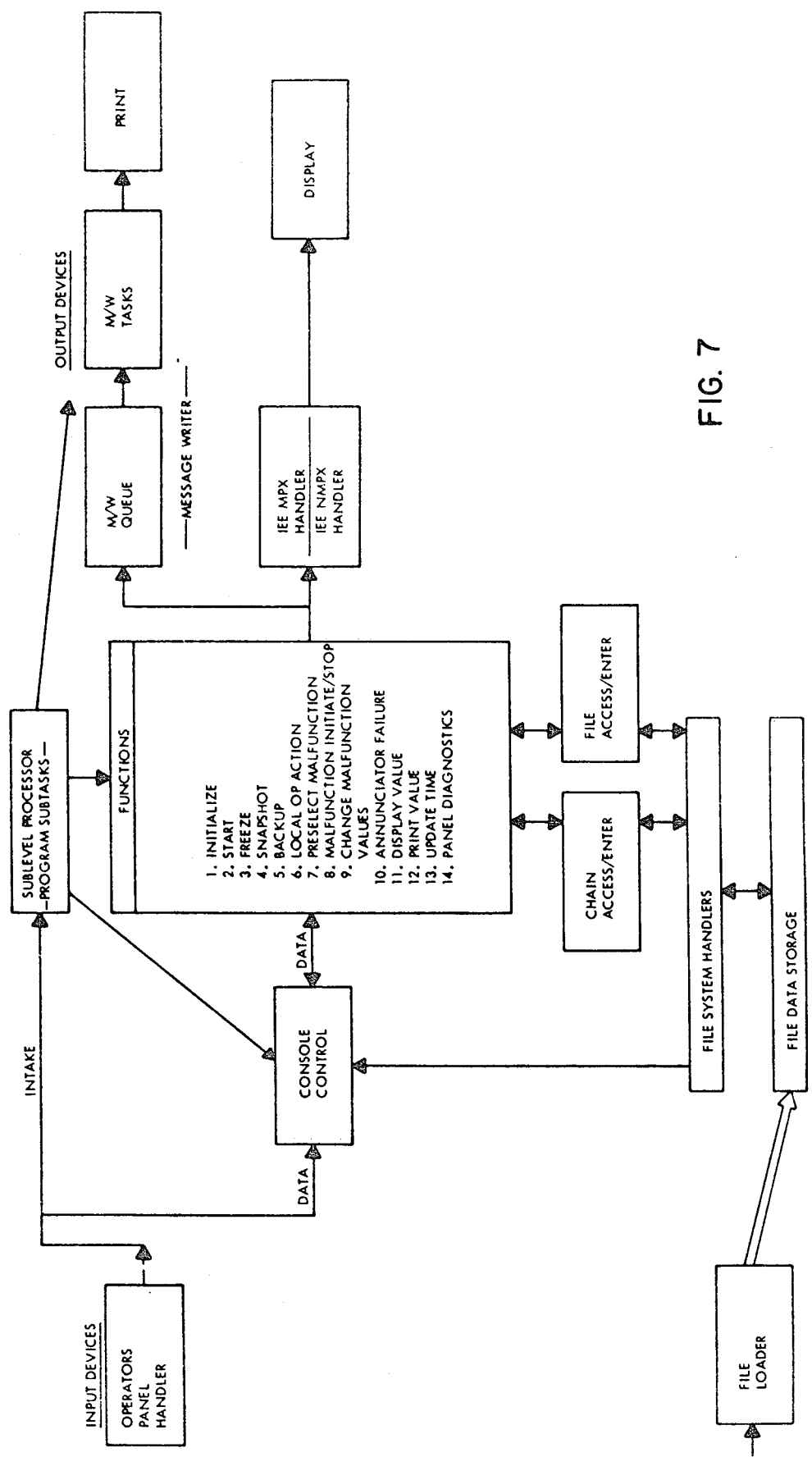
FIG. 7 is a functional block diagram of the instructor's console system of FIG. 2.

Referring to FIG. 7, the instructor's console system provides a tool for the instructor to manipulate and control the plant simulator. The software structure which interfaces with the instructor's console resides in the B machine.

Figure 8:
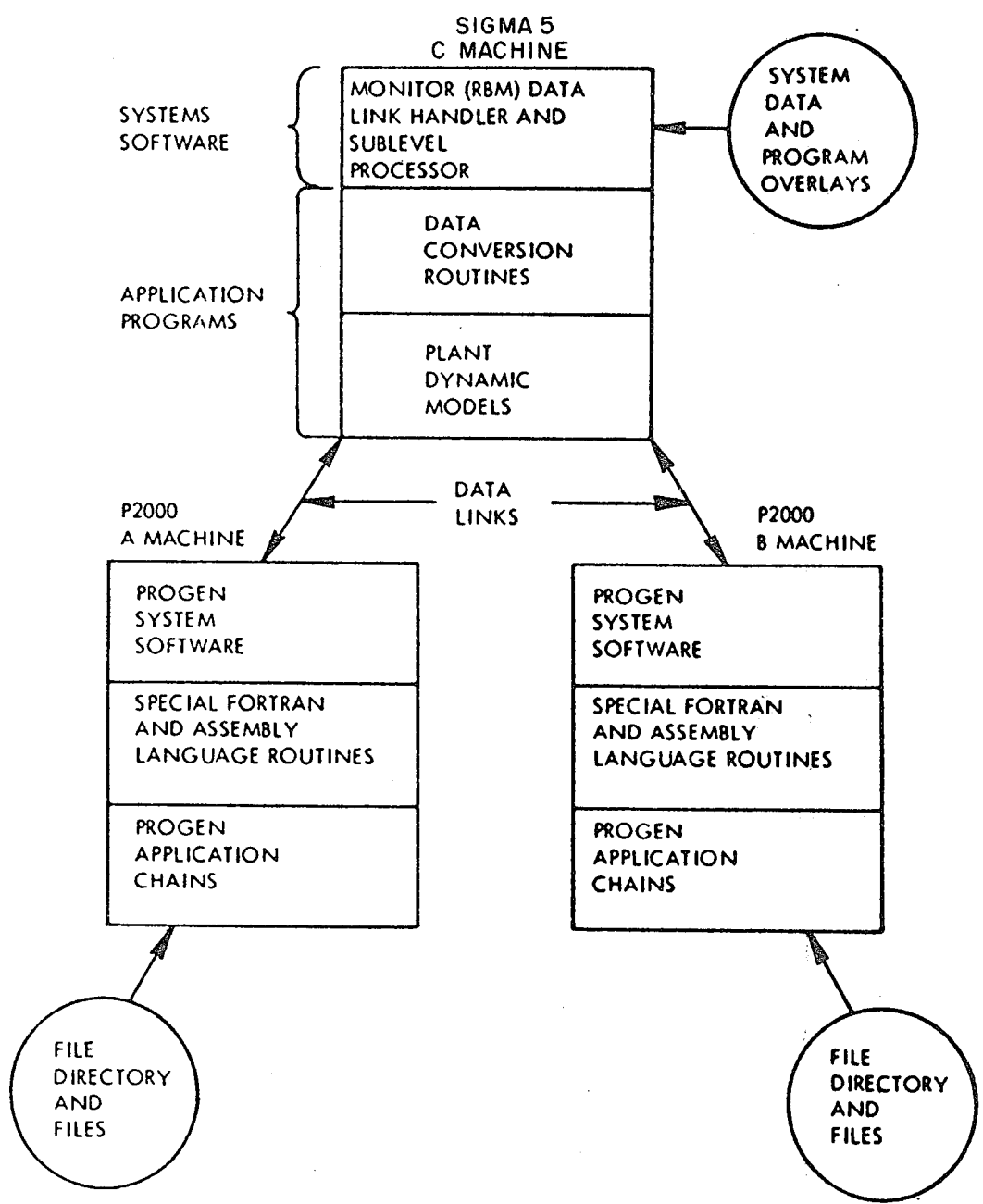
FIG. 8 shows the structure of the simulation software for the A machine, B machine, and C machine shown in FIG. 2.

As shown in FIG. 8, the plant simulator employs software which is interrelated in a three machine configuration. Most of the application type program require the execution of several programs on two or on all three computers.

Figure 9:
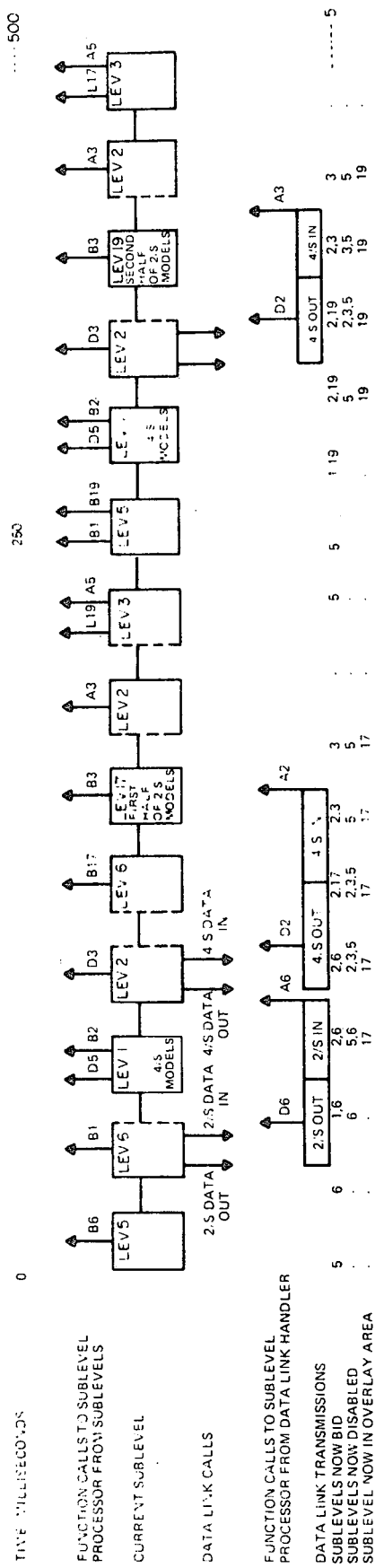
FIG. 9 is a block diagram of the software system control of the C machine.

In operation, and referring to FIG. 9, the software system control is accomplished by the execution of various sublevel programs in a fixed sequence in the C machine. Although the sublevel processor of the C machine can handle 32 sublevels, only the sublevels 1, 2, 3, 5, 6, 17, 19, 20, 31, and 32 are used in the nuclear simulator of the present embodiment of the invention. Each sublevel contains a calling subroutine (LEV$x$, where $x$ equals sublevel number) which performs subroutine calls and function calls to the A and B machine sublevel processors, the data link handler, and the disc handler. The sublevel calling routines are executed in a fixed order each ¼ second period. The model programs are compiled and loaded as subroutines and are called by the sublevel calling routines. Those models executed on every run, that is every ¼ second, are referred to as 4/S models, while those executed every other run are called 2/S models. The remaining models are non-periodic and are executed only in response to a specific set of input conditions. Data used or generated by the 4/S or 2/S models are referred to as 4/S data and 2/S data, respectively. The 4/S models are called from LEv1 and are always resident in core; 2/S models are divided into resident and non-resident groups. Resident 2/S models are called from LEV2. The non-resident 2/S models are in turn divided into two halves, each half executing on alternate runs. The first half is called by LEV17, the second half by LEV19. Non-periodic models are all called by LEV20. At ¼ second intervals, LEV5 is set active and immediately run, if not disabled, as described hereinafter. Since alternate runs cause different groups of model programs to be run, that is, first half and second half of 2/S non-resident models, LEV5 and several other sublevels take slightly different action on alternate runs.

In describing the operation of the software system control reference is made to FIG. 9 and will cover two complete runs. At time zero as shown in FIG. 9, LEV5, which is an activate level, bids LEV6, then exits and deactivates. LEV6 now runs and bids LEV1, then calls the data link handler to send 2/S output from the model on the previous run, and then calls the data link handler to fetch new 2/S data from the A and B machines to the C machine.

At this point LEV6 is active and resident, but disabled, awaiting an interrupt from the data link to signal completion of the above transmission. LEV1 is now the highest active, able, and resident sublevel. Thus LEV1 runs and disables LEV5 to ensure that a new run will not begin should the current run extend for some reason in excess of 250 milliseconds. Then LEV1 bids LEV2; and calls the conversion routine, which program converts data from the A and B machine format to the C machine format. Then the pump handler routine is called which is followed by calling the 4/S model. Subsequently LEV1 calls the conversion routine to convert data produced by the 4/S model from the C machine format to the A and B machine format. It then calls the analog output routine to convert data produced by the 4/S models from the C machine format into analog output format and then exits and deactivates.

At this point it is possible that the data link has completed its 2/S data transmission and has enabled LEV6. However, LEV2 is also active, able, and resident, and now runs. LEV2 disables LEV3, which will be set active soon but should not run until certain other functions are complete. Then LEV2 calls the data link handler to transmit 4/S data from the C machine to the A and B machines and fetch new 4/S data from the A and B machines to the C machine; and then calls the controller handler routine; and finally disables LEV2 until completion of the data link transmission.

As previously mentioned LEV6 has been enabled by the data link handler; and now bids LEV17, exits, and deactivates. LEV17 is active, able, and should be resident. This sublevel contains the first half of the 2/S model to be executed on the first run of a ½ second interval. Loading of LEV17 into core was initiated by LEV3 on the previous run and should be completed at this time. If not completed, nothing executes until loading is completed and LEV17 is recognized as resident by the sublevel processor.

When LEV17 is so recognized as resident, it calls conversion routine to convert 2/S data from A and B machine format to C machine format; then calls the valve handler routine; calls the first half of 2/S models; resets the flag to indicate that the first half of 2/S models has been executed; bids LEV3; and exits and deactivates. The data link enables LEV2 when the transmissions initiated by LEV2 are complete. Nothing executes until this occurs.

When LEV2 resumes execution, it enables LEV3, exits and deactivates. When LEV3 is active, it initiates loading of LEV19 which is the overlay sublevel containing the second half of the 2/S models; it checks if a snapshot is requested and if so, calls the snapshot routine; enables LEV5; and exits and deactivates. Since no sublevels are now active, nothing executes and the C machine goes into a WAIT condition until the next ¼ second clock pulse arrives and LEV5 is set active by the sublevel processor.

When LEV5 is set active, it executes for the second time in this ½ second interval. LEV5 bids LEV1 and LEV19, then exits and deactivates.

LEV1 now runs and disables LEV5, bids LEV2, calls the conversion routine to convert 4/S data from A and B machine format to C machine format; calls the pump handler routine; calls the 4/S models; calls the conversion routine to convert 4/S data from C machine format to A and B machine format; calls the analog output routine; and exits and deactivates.

LEV2 is now active, and it disables LEV3; checks to determine if a snapshot has been requested and, if so, places certain snapshot parameters in buffers for transmission to the A machine. It then calls the data link handler to transmit 4/S data from the C machine to the A and B machines and fetch new 4/S data from the A and B machines to the C machine. It then calls the controller handler routine, the resident 2/S models, and disables LEV2 until completion of the data link transmission.

LEV19 now executes or executes as soon as it is completely loaded into core. The loading of LEV19 was initiated by LEV3 at the end of the previous run. LEV19 calls the second half of the 2/S models, then calls the conversion routine to convert 2/S data from the C machine format to the A and B machine format, and calls the analog output handler. LEV19 then sets S2 flag to indicate that the second half of the 2/S models has executed. If flux mapping is called for by the models, LEV19 bids LEV20, then exits and deactivates. If flux mapping is not called for, LEV19 bids LEV3, exits and deactivates. LEV2 now resumes execution and enables LEV3, exits and deactivates.

If the flux mapping program has been called for, LEV20 was bid by LEV19 (not shown). Thus, LEV20 calls the flux mapping program, resets the flux mapping flag, bids LEV3, and exits and deactivates. LEV3 is now active and initiates the loading of LEV17; it checks to determine if a snapshot is requested and if so, it calls the snapshot routine; it enables LEV5; and exits and deactivates. This completes the execution of the second run. All models have now been executed at least once. The C machine goes to a WAIT condition until LEV5 is again set active on the ¼ second mark.

SYSTEM SOFTWARE FOR THE C MACHINE

The system software for the C machine comprises the real-time batch monitor RBM and system extension programs which provide additional capability in the application usage of the RBM foreground service. Referring to FIG. 3, the system extension programs comprise a sublevel processor to expand an interrupt level to 32 sublevels referred to at block 40A, a computer interface unit handler 41 capable of controlling two CIU units simultaneously, a disc handler included in boxes 43, 44 and 45, capable of handling input/output to a specified number of files in a direct-access, no wait mode, a real-time clock task with a 60 cycle base included in block 40, and a system diagnostic printout routine included in block 43. The system extension programs also include a supplementary initialization routine which stores the required patches in the RBM system when the foreground programs are initiated, and a foreground programmers console program (not shown).

Referring to FIG. 3, the system software extension includes interrupts at several levels. On level 5A, there are synchronous interrupt subroutines, which are entered 60 times per second to serve as a time base for ¼ second and ½ second models, and to maintain the data link timer count. On level 5C there is an input/output interrupt and action subroutines for data link, disc handlers, and data link respond routines. On level 61C there is an interrupt to print diagnostic messages which previously have been entered into the diagnostic queue. On level 62C there is an interrupt for a clean-up routine for the non-resident segment loader. This routine marks the sublevel resident and marks the segment loader free. On level 63C there is the interrupt for the sublevel processor.

The RBM monitor (RBM-COO release) is used with the following options:

| Option | Definition |
| --- | --- |
| CFILES | Compressed Files |
| CREAD | Card Reader |
| CPUNCH | Card Punch |
| JOBACCT | Job Accounting |
| IOEX | IOEX Devices |
| LPRINT | Line Printer |
| PATCH | Patch Area |
| RAD | System RAD |
| RUNQ | Program Run Queueing |

The RBM monitor functions as described in the publication entitled XDS Sigma 5/7 Real-Time Batch Monitor (RBM-2) Reference Manual (90 15 81A). However, there are certain patches which are inserted in the RBM system by the supplementary initialization routine at startup. These patches are as follows:

| Location | Function |
| --- | --- |
| DCT5+CIU DEVICE INDEX | Set end-action flag for CIU Data-Link Handler to specify IOEX device |
| DCT11+CIU DEVICE INDEX | Set end-action address for CIU Data-Link Handler |
| RBM+23A$_x$ | Keep interrupt lockout set until the RBM Exit routine completes execution |
| RBM+F46$_x$ | Move the Temporary Stack for the RBM I/O interrupt task to a user area, and increase its size to provide space for nesting CAL's in the CIU Data-Link End-Action subroutine |

The patch contents are:

| Location | Old | New |
| --- | --- | --- |
| BA(CDT5+CIV DEVICE INDEX | | 1 |
| DCT11+CIU DEVICE INDEX | | CIU INT |
| RBM+23A$_x$ | 6D000027 | B $+1 |
| RBM+F46$_x$ | | DATA STCKLOC |
| +F47$_x$ | | GEN,16,16 |
| | | STCKSIZE,0 | wherein BA is the byte address, STCKLOC is the user's stack location minus 1, and STCKSIZE is the user's stack size.

The sublevel processor 40A handles from 1 to 32 sublevels in a run-to-completion-or-to-suspension mode. The sublevel priority structure is maintained and controlled by using three subtask status words and two subtask status tables. The sublevel status words are active, able, and resident. The highest priority is active, the next highest priority is able, and the least priority is resident. The two subtask status tables are a table for the initial start address and a table for the restart address, with the highest numbered sublevels in each table being of the highest priority. In the initial start address table, one word per sublevel is used commencing at sublevel 14 and extending through sublevel 31. In the restart address table, a suspend code during input-/output is provided for each sublevel up to sublevel 7.

In describing the initialization and service routines of the sublevel processor of the C machine, reference will be made generally to the sublevel processor flow charts illustrated in FIGS. 10/1 through 10/5. The program of which the sublevel processor is an integral part is read in and initialized by a RUN-IN following boot strap. Initialization includes reading in all the overlays which are marked "resident" in the initial sublevel status word, and triggering the sublevel processor interrupt level 63 (see FIG. 10/1 and FIG. 3). If the overlay area is available (OVAL equals zero) and the overlay loader is not busy (SEGFLEG equals zero), the program initiates loading to satisfy the highest priority outstanding load request. Explicit load requests, which are placed by calls to "Load", are satisfied before the implicit requests resulting from calls to "Start" for non-resident sublevels.

The sublevel processor includes a total of seven service routines, three of which are reentrant to permit usage from the input/output interrupt level. Referring to FIG. 10/2, in order to bid for a sublevel, the calling sequence is: CALL START (SUBLEVEL NO. [, SYNC QUEUE NO.]). If the "Sync Queue" parameter is missing, or in other words if there is no sync queue, the specified sublevel processor interrupt is set active. If the overlay area is available, the routine checks to see if any non-resident tasks are waiting to be loaded, that is, if the set sublevel bit equals one, and if so loading is initiated before returning to the caller. If a sync queue number is specified, the sublevel is instead active in the appropriate periodic active word (ACTV1, ACTV2) to be activated periodically by the sync interrupt routine. The sync queue number is two for a one-half second period and three for a one quarter second. The subroutine then returns to the caller. To load a non-resident sublevel, under conditions of no automatic start, the calling sequence is: CALL LOAD (SUBLEVEL NO.). The specified sublevel is placed into a load queue to be loaded as soon as the overlay area is available; if possible, loading is initiated before returning to the caller. Load request in the queue are given a higher load priority than the implicit load request which occur when a start request is placed for a non-resident sublevel. The overlay area is unavailable until the sublevel exits by either a call to SEXIT or a return. Therefore, a call to load must be followed at some point by a call to start to prevent permanent unavailability of the overlay area.

For the service routine, suspend on code, the calling sequence is as follows: CALL SUSPND (CODE). The calling sublevel is suspended (disabled) on the specified code. (see FIG. 10/3). Each input/output device is assigned a 1-byte, non-zero, suspend code. The subroutine exits to the scheduler. The reentrant subroutine to suspend unconditionally has a calling sequence as follows: CALL SUSPEND1 (SUBLEVEL 1, SUBLEVEL 2 ... ). The specified sublevels are suspended unconditionally, with the exception of the calling sublevel, by setting the bytes to zero. The calling sublevel will not be suspended, and the parameter will be ignored, if included. The subroutine then returns to the caller.

Another reentrant routine is unsuspend on code, that has a calling sequence: CALL UNSUSP (CODE). The sublevel count is set to equal one and the highest priority sublevel is suspended on the code is unsuspended. This subroutine then returns to the caller. The reentrant service routine unsuspend sublevel unconditionally has the calling sequence as follows: CALL UNSUSP1 (SUBLEVEL 1, SUBLEVEL 2, ... ). The specified sublevels are unsuspended unconditionally and the subroutine returns to the caller.

Finally, the service routine to exit has the calling sequence: CALL SEXIT [(SUBLEVEL NO., SYNC QUEUE NO.)] (See FIG. 10/1) If no parameters are present, the calling sublevel is deactivated, and its restart address is set to its initial value. This subroutine returns to the scheduler; and this type of request can only be made from a sublevel.

The data link handler, the flow chart for which is shown in FIGS. 11/1 through 11/3, uses the RBM IOEX calls to control the input/output in either an initiate mode or a respond mode; that is, where the C machine is the master or the slave. The initiate routines are reentrant. Initiation requests do not cause suspension; but instead, transfer completion is posted in a user-supplied flag word. If the handler is busy on entry, the request is queued and serviced later on the input/output interrupt level. Queued requests from high priority sublevels are serviced first. A special check subroutine is provided to monitor the status of initiate requests. Respond type input/output is performed on the input/output interrupt level. An end action subroutine address may be supplied to which the handler will transfer control at the successful conclusion of a respond type data transmission The software automatically performs up to three retries in respond to hardware detected transmission errors. Irrecoverable errors trigger diagnostic printout. Such calling sequences are as follows:
CALL MDLO (INDX, IFLAG) (for initiate output) and
CALL MDLI (INDX, IFLAG) (for initiate input). IFLAG is used to post completion status, as follows:

| 0 | 8 | IFLAG 15 | 31 |
|---|---|---|---|
| COMPL. STATUS | NOT USED | FOR HANDLER USE ONLY | |

Completion Status byte = 0, transfer not complete
= 80, transfer complete

The INDX format is:

| 0 | 8 | 16 | 24 | 31 |
|---|---|---|---|---|
| NOT USED | NOT USED | DEVICE INDEX | PARAMETER INDEX | | where the Device Index byte is 0 for transmissions to or from P2000 A, 1 for P2000 B. The parameter index points to a parameter table entry describing the transfer as follows:

INDX = 0–7, SEND OR RECEIVE (except initiate with index 0)

| Initiate Parameter Table | Respond Parameter Table |
|---|---|
| Local Buffer Address Halfword Count | Local Buffer Address Halfword Count End-Action Subroutine Address or 0 |

A call to initiate input with index = 0 is illegal. Calls to initiate output with index = 0 are legal, but require the following special calling sequence:
CALL MDLO (INDX, IFLAG, LOCAL BUFFER ADDRESS) The call causes a fixed length buffer to be transmitted; and the system must contain a set of parameter tables for each data link. Also, the data link handler includes a subroutine MDLCHK to check the completion status of initiate requests. The calling sequences for such checking subroutine is:
CALL MDLCHK (IFLAG, DEVICE INDEX) where IFLAG corresponds to the one used in the call to MDLO or MDLI, and DEVICE INDEX equals zero for the channel interface unit (CIU) of the A machine and DEVICE INDEX equals one for the CIU of the B machine. If a completion has been posted in IFLAG, the routine returns to the caller immediately. Otherwise the calling level is suspended on the device code to await input/output completion, and the routine exits to the sublevel processor. This routine is not reentrant and must be entered from a sublevel.

For initiate request (MDLI), the data link handler first builds a queue entry for the request. Inconsistent request parameters cause the request to be aborted and an error or diagnostic to be printed. If the CIU is busy, the handler returns at this point. Otherwise, it transfers to a routine FRMBLK, which builds at input/output control double word (IOCD) from the highest priority queue entry, and initiates a transfer through routine IXFER using the RBM IOEX function, before returning to the caller. The request entry remains in the queue until the transfer is successfully completed.

For respond request (MDLO) the handler does not build a queue entry, but builds an IOCD from the parameters related to the received index. Input/output is initiated since the CIU must be free to receive the respond request.

The disc handler routine operates within the RBM file structure. It provides direct access, no wait transfers for any specified number of disc files, and queuing for three simultaneous request. The calling sequences are as follows:
1. CALL [$^{DWRITE}_{DREAD}$] (IFLAG, CORE, XXX, NOWORDS [, REC])
which are callable from an interrupt level or sublevel, where:
IFLAG = integer scalar for posting completion
CORE = unsubscripted array name specifying core buffer
XXX = device number between 20010 and 211 which has been identified with an unblocked RAD file via a loadtime "assign" command. (For disc writes, the file must reside in an area of disc accessible to the calling program.)
NUM = number of words to be transferred
REC = optional starting record; if not specified, the transfer will begin at record 0
The disc handler initiates the transfer and returns to the caller. It is initialized to accommodate up to three simultaneous request, as previously mentioned, and to handle request from up to 12 different files.
CALL DCHECK (IFLAG) (from sublevel only)
If the disc input/output related to IFLAG has completed, the routine returns to the caller immediately. If it has not completed, the sublevel is suspended on code 3 to be unsuspended at input/output completion.

CALL CLOSE (XXX)

Which is callable from the interrupt level or sublevel, and where XXX is the device number of the file. CLOSE must be executed at the conclusion of all write-ins to a file. This subroutine causes the new file parameters to be entered into the master file directory on disc, enabling the new file parameters to survive a boot strap.

At the successful conclusion of a respond type transmission, the data link transfers to a specified end action subroutine. The end action subroutine is entered on the input/output interrupt level in master mode. On entry, R15 equals return address, and R14 equals zero (argument count). The Fortran equivalent of this entry is CALL CIUSUB, where CIUSUB is a specified parameter. The subroutine may be written in Fortran, may call the data link routines MDLO and MDLI, the disc routines DWRITE, DREAD, DCLOSE, and the reentrant sublevel processor routines hereinbefore described, but may not call the check routines MDLCHK or DCHECK. The sublevel processor then transfers control to the highest priority sublevel which is active, able, and resident. If there is no sublevel that is active, able, and resident, the sublevel processor exits. The sync interrupt task in entered at one quarter second intervals to check the appropriate periodic bid request words ACTIV1, and ACTIV2. Any periodic request will then be OReed into the scheduler active word. The segment loader clean-up task is entered at the conclusion of a load to set the sublevel resident and clear the loader busy flag.

In addition to the standard diagnostic messages printed by RBM and described in the RBM reference manuals hereinbefore mentioned, the system prints a diagnostic message "ERROR CCCC LEV XX", where CCCC is a code describing the malfunction, and XX is the sublevel number on which the malfunction occurred, or zero if an input/output interrupt level. Following the error printout, the system hangs up in a dynamic weight (B $). Three more re-tries can be initiated by setting the machine to IDLE, incrementing the instruction address then setting the machine back to RUN.

The code CCCC includes malfunction in accordance with the following list.

| Code | Meaning |
| --- | --- |
| OL20 | Parameter error in calling for data-link I/0, P2000 A — call aborted |
| 1L20 | Same as above, for P2000 B |
| OL21 | Data-link queue full, P2000 - — call aborted |
| 1L21 | Same as above, for P2000 B |
| OL22 | Unexpected data-link interrupt, P2000 A (undecodable respond request, etc.) |
| 1L22 | Same as above, for P2000 B |
| OL23 | CIU Manual Mode, P2000 A |
| 1L23 | Same as above, for P2000 B |
| OL24 | Irrecoverable initiate error, P2000 A |
| 1L24 | Same as above, for P2000 B |
| OL25 | Irrecoverable respond error, P2000 A |
| 1L25 | Same as above, for P2000 B |
| OL26 | SIO not accepted, P2000 A |
| 1L26 | Same as above, for P2000 B |
| OL27 | Data-link timer expired, P2000 A |
| 1L27 | Same as above, for P2000 B |
| Segment Loader Error | |
| S28 | Error loading non-resident segment |
| Disc Handler Errors | |
| D 01 | Irrecoverable read/write error after three re-tries; call is aborted |

-Continued

| Code | Meaning |
| --- | --- |
| D 02 | Parameter error in read, write or close calling sequence; call is aborted |
| D 03 | No FPT available to service the request; call is aborted |

As previously mentioned an initialized real time system program is a foreground program. The RBM and the background processors are necessary for off-line system preparation and loading, but only the RBM foreground services are an integral part of the on-line system. The foreground program organization includes root and application programs. The foreground system provides one overlay area. Application programs executing on sublevels may be designated as either permanently resident or non-resident.

The root programs of the foreground program organization comprise the sublevel processor, data link (CIU) handler, a sublevel processor initialization program, a user data link respond end action subroutine or subroutines, user resident subroutines which may be called by several sublevels not all permanently resident, a block data program to allocate and initialize blank common data and/or labeled common data, and system library subroutines necessary to satisfy linkages required by the foregoing. The application programs of the foreground program organization execute in the sublevel priority environment to perform the process control and/or data acquisition function.

To combine root and application programs and form a foreground system, the program for each sublevel is preceded with the cards necessary to form a subroutine with entry definition LEV1, LEV2 ... LEV32 corresponding to sublevel priority 1, 2, 3 ... FIGS. 12/1 through 12/3 illustrate examples of binary card object modules. The language processor control card should include the BO option to obtain a binary object module, but must not include the RT option. The binary card object modules are then combined to form a foreground program load module and loaded into a file for subsequent execution. To initialize the sublevel processor and connect the data link handler with the data link parameter tables, the following system description parameters must be defined and assembled into the system initialization program:

1. CIU Respond Interrupt connections; these values are obtained from the currrent SYSGEN listing:

```
DCT5                EQU
DCT11               EQU
```

2. System Interrupt definitions:

```
CLKINT     EQU - Counter = 0 interrupt which is
                  connected to a 60-Hz source for
                  time base
DIAGINT    EQU - Diagnostic printout task interrupt
OVINT      EQU - Overlay Loader cleanup interrupt
                  level
SCHDINT    EQU - Sublevel Processor Interrupt level
CLKINIT    EQU - 1/60-sec delay before start of first
                  system period
```

3. Data-Link definitions:

```
NOCIU              EQU - Number CIU's
```

-Continued

| | | |
|---|---|---|
| IOEXNDX | EQU - | RBM device index of first CIU (from SYSGEN listing) |
| ERRCNT | EQU - | Number re-tries before signaling irrecoverable data-link transmission error |

4. Sublevel Processor definitions:

| | | |
|---|---|---|
| INILEV | EQU - | Application Initialization sublevel number; 0 if none |
| IABLE | EQU - | Bit image of initially able tasks |
| IRESD | EQU - | Bit image of permanently resident tasks |
| IACT1 | EQU - | Bit image of initial ½-sec periodic bid tasks |
| IACT2 | EQU - | Bit image of initial ¼-sec periodic bid tasks |

5. Data-Link Parameter tables:

Four parameter tables are required for each data link:
Read Initiate table, Write Initiate table
The Initiate tables require two entries per index: the buffer address and the halfword count. The index tables cannot contain holes; unused indexes must contain dummy parameters. Index 0 is invalid for read initiate. (A set of dummy parameters is still required.)
Read Respond table, Write Respond table
The Respond tables require three entries per index: the buffer address, the halfword count, and the address of the user end-action subroutine (or 0 if none).
Halfword counts at both ends of a data link must be the same to prevent illegal length errors.
The label for the first entry in each table is fixed as follows:

| Label | Table Usage | |
|---|---|---|
| RDINIT0 | Read-initiate parameters | - CIU 0 |
| RDINIT1 | Read-initiate parameters | - CIU 1 |
| WRINIT0 | Write-initiate parameters | - CIU 0 |
| WRINIT1 | Write-initiate parameters | - CIU 1 |
| RDRESP0 | Read-respond parameters | - CIU 0 |
| RDRESP1 | Read-respond parameters | - CIU 1 |
| WRRESP0 | Write-respond parameters | - CIU 0 |
| WRRESP1 | Write-respond parameters | - CIU 1 |

C MACHINE SIMULATOR PROGRAMS

Figure 13:
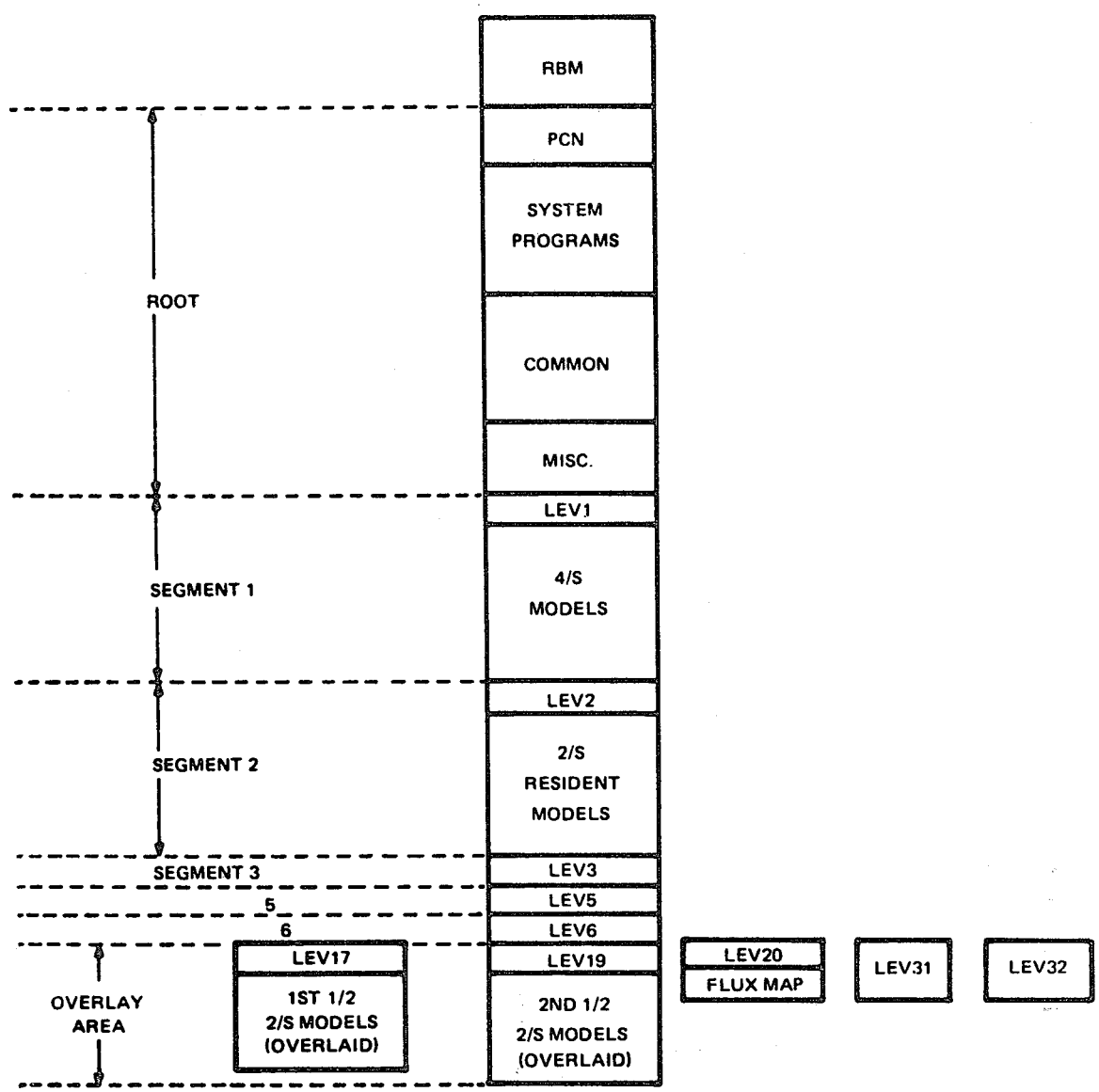
FIG. 13 illustrates the core diagram of the C machine.

Referring to FIG. 13, the core diagram of the Sigma 5 or C machine shows the sublevels LEV1, LEV2, LEV3, LEV5, LEV6, LEV17, LEV19, LEV20, LEV31, and LEV32 which are handled by the sublevel processor for the C machine program system which in this embodiment provides most of the simulation or modeling of the nuclear power gnerating apparatus (FIG. 1). Each sublevel includes respective calling subroutines LEV which perform subroutine calls and function calls to the sublevel processor, data link handler, and disc handler. The sublevel calling routines LEV are executed in a fixed order based on a one quarter second period. The programs in the plant model or simulation program system, invention, are called by the aforementioned sublevel calling routines. Some of the model programs are executed on every run or cycle of the sublevel processor, that is, every one quarter second (4/S models); and other model programs are executed on every other run or cycle, that is, every one-half second (2/S models). Other models are non-periodic, and are executed only in response to a specific set of input conditions.

The 4/S model subroutines, which are called from LEV1, and are always resident in core, are as follows:

| | |
|---|---|
| THERMO | FCALC |
| BOP | DETOUT |
| BOPAOA | XETOUT |
| STMGEN | CHAMBR |
| RHMSEP | PLTLT |
| BOPCTL | RODGO |
| ELCRNT | SETTMP |
| SECOND | RCSLOP |
| PADE | RCSLP2 |
| HWATER | PREZCON |
| SIGMAS | PRSRZR |
| TWATER | EXGENM |
| HWPSAT | |

The 2/S models, are segregated into resident and non-resident groups. The resident 2/S models which are called from LEV2 are as follows:

| | |
|---|---|
| AUXFED | SIS2 |
| ACUMM | SIS3 |
| SIMAIN | SIS4 |
| CONPRS | SIS5 |
| FWFLUD | SIS6 |
| SIS1 | SIS7 |

The 2/S models which are non-resident are in turn segregated into two halves, which each half executing on alternate runs. The first half of the non-resident 2/S models, which are called by LEV17 are as follows:

| | |
|---|---|
| AUXIL | LIMP |
| HAND | RCBORC |
| POISON | PRSRFT |
| FPROD | CVCS |
| RADMON | BORECY |
| TMCPLS | SEALFW |

The 2/S models which comprise the second half and are called by LEV19 are as follows:

| | |
|---|---|
| COCOOL | BFPEFF |
| RHR | CIRWTR |
| LIMCHK | SERWTR |
| BOPAO2 | SECLIM |
| TURSUP | LIMCK2 |

The non-periodic models that are called or executed only in response to a specific set of input conditions, and are called by LEV20, are as follows:

| | |
|---|---|
| TRACE | PLCHAN |
| CURROD | RODCHN |
| TILT | |

In addition to individual models listed above, and referring to the C machine simulator programs operation flow chart of FIGS. 14/1 through 14/4, the pump handler routine PHAND is activated from LEV1 prior to calling the 4/S models on every run of the cycle. The routine PHAND controls all of the simulated plant coolant pumps, except where noted herein. Subsequently, when LEV2 is active the subroutine CONHAN is executed, which routine operates all of the simulated apparatus controllers in the system, prior to calling the 2/S resident models. When level 17 is active, the subroutine VCHAND is executed, which subroutine controls all of the simulated plant valves except as hereinafter noted, just prior to calling the first half of the 2/S model non-resident subroutines.

It is understood that the various inventive features in the improved method and simulation system, may be implemented in either an analog, digital, or analog/digital with or without single or multiple computer apparatus. Also many of the features are applicable in the simulation of other pressurized water reactor plant arrangements, boiling water reactor plants, and gas and other nuclear plant arrangements. Also some features are applicable to fossil-fired power plants. It is further understood, that with respect to the individual models, that the changing of one or more models in the simulator does not affect the system, method, or operation of other models in the simulator.

It is understood that various inventive features in the improved method and system can be implemented by either computer software or computer hardware.

Reference is made to U.S. patent application bearing Ser. No. 333,901 entitled "Training Simulator For A Nuclear Power Plant" and filed by G. L. Gregg, R. E. Putman and J. W. Gomola which is assigned to the present assignee and filed concurrently herewith; and which is incorporated herein by reference and made a part hereof.

We claim:

1. A system for simulating the real-time dynamic operation of a nuclear powered electrical generating plant, comprising a control panel with a plurality of control devices corresponding to control devices of the plant being simulated and a plurality of indicating devices for monitoring the dynamic operation of the plant's response to the control devices, simulation means operative when activated to generate representations relating to the physical values of the simulated plant in accordance with the operation of the control devices to provide output data to the indicating devices, a plurality of priority processing means operative when activated to activate the simulation means, a synchronizing means to initiate at predetermined time intervals sequential activation of the plurality of priority processing means, said priority processing means including first means governed by the activation of one of the plurality of processing means during each time interval to render said one processing means ineffective to be activated by the synchronizing means at the beginning of the next succeeding time interval, second means governed by the activation of the one processing means to activate the simulation means, third means responsive to the completion of the generation of the simulation representations to activate said one processing means during the next succeeding time period, and means governed by the generated simulation representations to generate output data to predetermined indicating devices during each time period.

2. A system according to claim 1, wherein the simulation means and the priority processing means include a programmed digital computer.

3. A system for simulating the real-time dynamic operation of a nuclear powered electrical generating plant, comprising a control panel with a plurality of devices corresponding to distinct plant control devices and a plurality of indicating devices corresponding to distinct monitoring devices, simulation means when activated operative to generate plurality of representations relating to physical values of the simulated plant, a plurality of priority processing means, a synchronizing means to initiate at predetermined time intervals the sequential execution of the plurality of priority processing means for activating the simulation means, a first one of said processing means when in a first condition operative to be activate during each predetermined time interval in response to the synchronization means, a second one of said processing means responsive to the activation of the first processing means to operate the first processing means to a second condition, said second processing means also being operative to activate the simulation means, a third one of the processing means governed by the second processing means to transmit simulation representations to and from the control panel, a fourth processing means activated in response to the completion of the transmission of the simulation representations to operate the first processing means to its first condition, and suspension means responsive to the activation of the third processing means to delay operation of the fourth processing means until completion of the transmission of the simulation representations.

4. A system according to claim 3, further comprising a second simulation means operative when activated to generate a second plurality of simulation representations, and a fifth processing means operative when activated to activate the second simulation means, said third processing means being operative to activate the fifth processing means subsequent to initiation of the transmission of the first named plurality of simulation representations.

5. A system according to claim 4 comprising a sixth processing means governed by the inactive condition of the first processing means to initiate the transmission of the second plurality of simulation representations to and from the control panels subsequent to completion of the transmission by the third processing means.

6. A system according to claim 5 wherein the second processing means is activated in response to the completion of the initiation of the transmission by the sixth processing means, and means suspending operation of the sixth processing means and delaying activation of the fifth processing means until completion of the transmission by the sixth processing means.

7. A system according to claim 5 wherein the second plurality of simulation representations includes a first and second group, and such groups are activated in alternate periodic time steps.

8. A system according to claim 5 wherein the sixth processing means is operative to initiate the transmission of the second plurality of simulation representations during alternate periodic time intervals only.

9. A system according to claim 5 wherein the transmission of simulation representations by the third processing means is activated subsequent to the completion of the transmission of representations by the sixth processing means in alternate periodic intervals only.

10. A system according to claim 3 wherein each processing means includes a programmed digital computer.

11. A system for simulating the real-time dynamic operation of a nuclear powered electrical generating plant, comprising a control panel with a plurality of devices corresponding to distinct plant control devices and a plurality of indicating devices corresponding to distinct monitoring devices, a programmed digital computer, means including the programmed digital computer to generate when activated representations relating to physical values in the operation of the simulated plant, a plurality of priority processing means to activate the simulation means, a synchronizing means operative repetitively at predetermined time intervals to initiate the sequential activation of the plurality of priority processing means, said priority processing means including first means activated in response to each operation of the synchronizing means, second means governed by the first means to initiate the transmission of the generated representations to and from the control panels, third means activated by the second means to activate the simulation means, said third means being deactivated upon completion of the generation of the simulation representations, said second means being rendered active until completion of the transmission of the generated representations, and fourth means activated in response to the deactivation of the third means to operate the first processing means to its first condition, whereby the generation of simulation representations and the transmission of the generated representations are occurring concomitantly during each periodic time interval, and the beginning of each time interval is governed by the fourth means and the synchronizing means.

12. A system according to claim 11 wherein the initiation of the transmission of the generated simulation representations by the second means occurs prior to the activation of the third means.

13. A system according to claim 11, wherein the second means is rendered active while the third means is active.

14. A method of simulating the real-time dynamic operation of a nuclear powered electrical generating plant utilizing apparatus wherein a plurality of control devices correspond to simulated plant control devices and a plurality of indicating devices correspond to plant monitoring devices and a programmed digital computer means having a first storage means to store simulation representations and a second storage means to store input/output data for the control and indicating devices and having a plurality of simulation routines to calculate simulation data in accordance with the input data to vary the output data and including a synchronizing means to initiate the operation of a plurality of priority processing means during periodic time intervals, said plurality of priority processing means being operative to establish priority during each time interval, comprising activating a first processing means at the beginning of each periodic interval to begin a simulation cycle, preventing the next succeeding activation of the first processing means by the synchronizing means subsequent to each activation, during a periodic interval, initiating the transfer of data between the first and second storage means, initiating the calculation of the simulation data in the first storage means during the transfer of data, and activating first processing means in response to the synchronizing means only upon both the completion of the simulation calculations and the transfer of data.

15. A method according to claim 14 including another plurality of simulation routines, comprising further initiating the activation of the other plurality of simulation routines during the transfer of data calculated by the one plurality of simulation routines and activating the one plurality of simulation routines during the transfer of data calculated by the other plurality of simulation routines.

16. A method according to clam 15 wherein the programmed digital computer means includes at least two computers and the first storage means is in a first computer and the second storage means is in a second computer and data transfer means connects the first and second computers.

17. A method of simulating the real-time dynamic operation of a nuclear powered electrical generating plant utilizing apparatus that includes a control panel with a plurality of switches corresponding to distinct plant control devices and a plurality of indicating devices corresponding to distinct monitoring devices and a computer means with a first computer storage means for storing simiIation data and a second computer storage means for storing input/output data for the switches and indicating devices and wherein a plurality of simulation routines calculate the simulation data in accordance with the input data to vary the output data and wherein a synchronizing means initiates the operation of a processing means at periodic time intervals, said processing means being operative to initiate the running of a plurality of individual priority means, comprising activating a first priority means at the beginning of a first portion and a second portion of each periodic time interval in response to the operation of the processing means, activating a second priority means upon deactivation of the first priority means in the first portion of each time interval to initiate a first transmission of data between the first and second storage means and suspend operation of the second priority means, activating a third priority means in response to the suspension of the second priority means in the first portion of the time interval and in response to the deactivation of the first priority means in the second portion of the time interval to initiate the execution of a first plurality of simulation routines and suspend the first priority means, activating a fourth priority means in the first and second portions of each time interval in response to the deactivation of the third priority means in each respective portion to initiate a second transmission of data in the first portion of each time interval and a third transmission of data in the second portion of each time interval, deactivating the second priority means upon the completion of the first transmission of data, activating a fifth priority means upon deactivation of the second priority means to initiate the running of a second plurality of simulation routines, activating a sixth priority means upon completion of the initiation of the third data transmission by the fourth priority means in the second portion of the time interval to initiate the running of a third plurality of simulation routines, deactivating the fourth priority means subsequent to the deactivation of the fifth priority means and sixth priority means in each portion of the time interval upon completion of the respective second and third transmission of data, and activating the first priority means upon the deactivation of the fourth priority means in each portion of the time interval during the first and second portions of each time interval when all data is processed and transmitted.

18. A method according to claim 17 wherein the first transmission of data in the first portion of each cycle includes the data calculated by both the second and third simulation routines.

19. A method according to claim 17 wherein the second and third transmission of data includes the data calculated by the first simulation means.

20. A method according to claim 17 wherein the first transmission of data in the first portion of each cycle includes the data calculated by the second and third simulation routines in the first and second portion of each preceding time step.

21. A method according to claim 17 wherein the first storage means is in one computer and the second storage means is in another computer, and the processing means is in the other computer.

22. A method according to claim 17 wherein the first and second portion of each time interval is equal.

23. A method according to claim 22 wherein each portion of the time interval equals substantially one quarter of a second.

24. A system for simulating the real-time dynamic operation of a nuclear-powered electrical generating plant, comprising a control panel having a plurality of control devices corresponding to the control devices of the plant being simulated and a plurality of monitoring devices for indicating the dynamic operation of the plant's response to the control devices, a plurality of simulation means operative when activated to generate representations of physical values relating to the operation of respective portions of the simulated plant during a first time interval that varies depending on the extent of change of the generated physical values, synchronizing means operated at the beginning of successive predetermined second time intervals, priority processing means operative when activated to activate each of the simulation means in a predetermined sequence, means including the priority processing means governed by the operation of the synchronizing means and the completion of the generation of the physical value representations by the plurality of simulation means to activate the priority processing means at the beginning of successive time intervals corresponding to the end of the longer of either of the respective first and second time intervals, and means including the priority processing means responsive to the generated physical values to operate the monitoring devices during each of the last named time intervals, whereby all of the simulation representations are generated prior to the beginning of the next succeeding time interval.

25. A system according to claim 24, wherein the simulation means and the priority processing means is a programmed digital computer.

26. A system according to claim 24 wherein the second time intervals are not less than approximately one-fourth of a second.

27. A system for simulating the real-time operation of a nuclear-powered electrical generating plant, comprising a control panel having a plurality of control devices corresponding to the control devices of the plant being simulated and a plurality of monitoring devices for indicating the dynamic operation of the plant's response to the control devices, a plurality of simulation means operative when activated to generate representations of physical values relating to the operation of respective portions of the simulated plant during a first time interval that varies depending on the extent of change of the generated physical values, means when activated to transmit the representation of the condition of the control devices to the simulation means and to transmit from the simulation means to the indicating devices generated representations of the physical values, synchronizing means operated to the beginning of successive predetermined time intervals, priority processing means operative when activated to activate each of the transmitting means and the simulation means, said means being governed by the operation of the synchronizing means and the completion of the generation of the physical value representations by the plurality of simulation means and the transmission of generated representations by the transmitting means at the beginning of successive time intervals corresponding to the end of either of the first and second time intervals, and means including the priority processing means to activate the simulation means and the transmitting means concomitantly during each time interval.

28. A system according to claim 27 wherein the simulation means includes a programmed digital computer means.

29. A system according to claim 28 wherein the simulation means is in one programmed digital computer means, the control panels are operatively connected to another computer, and the transmitting means is a data link operatively connecting the one and the other computer.

30. A system according to claim 29 wherein the priority processing means and the simulation means are in the one computer.

* * * * *